US007956848B2

(12) United States Patent  
Chaudhri

(10) Patent No.: US 7,956,848 B2
(45) Date of Patent: Jun. 7, 2011

(54) VIDEO CHAPTER ACCESS AND LICENSE RENEWAL

(75) Inventor: Imran A. Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 825 days.

(21) Appl. No.: 11/849,966

(22) Filed: Sep. 4, 2007

(65) Prior Publication Data

US 2009/0058822 A1 Mar. 5, 2009

(51) Int. Cl.
*G06F 3/041* (2006.01)
(52) U.S. Cl. ........................................ 345/173; 715/719
(58) Field of Classification Search .......... 345/156–178;
715/716, 719–722, 810, 835, 838, 863;
178/18.01–18.09, 18.11, 20.01
See application file for complete search history.

(56) References Cited

U.S. PATENT DOCUMENTS

| | | | | |
|---|---|---|---|---|
| 6,262,724 | B1 * | 7/2001 | Crow et al. | 715/723 |
| 2001/0007455 | A1 * | 7/2001 | Yoo et al. | 345/856 |
| 2004/0046801 | A1 * | 3/2004 | Lin et al. | 345/810 |
| 2005/0024341 | A1 * | 2/2005 | Gillespie et al. | 345/173 |
| 2005/0044509 | A1 * | 2/2005 | Hunleth et al. | 715/834 |
| 2006/0026521 | A1 | 2/2006 | Hotelling et al. | |
| 2006/0197753 | A1 | 9/2006 | Hotelling | |
| 2007/0189737 | A1 | 8/2007 | Chaudhri et al. | |

OTHER PUBLICATIONS

Movielink website, 1 page. How long can I store a movie?, downloaded Aug. 9, 2007 http://www.movielink.com/kb/user/article.jsf?id=300021.
Movielink website, 1 page. Downloadable Movies are Here, downloaded Aug. 9, 2007 http://www.movielink.com/store/web/help/eLanding.jsp.
PCWorld website, 2 pages. Return to: Video Without Wires?, downloaded Aug. 9, 2007 www.pcworld.com/zoom?id-116997&page=1 &zoomIdex=1.
Big Picture Big Sound website, 1 page. mlink player, downloaded Aug. 9, 2007 http://www.bigpicturebigsound.com/uploads/mlink_player_001.jpg.
Wikipedia.org: "iPhone", XP002508126, Retrieved from the World Wide Web: http://en.wikipedia.org/w/index.php?title=IPhone &oldid=154929608, 2007, 24 pages.
International Search Report corresponding to International Application No. PCT/US2008/072702, dated Dec. 30, 2008, 4 pages.
International Preliminary Report on Patentability corresponding to International Application No. PCT/US2008/072702, dated Mar. 18, 2010, 8 pages.

* cited by examiner

*Primary Examiner* — Stephen G Sherman
(74) *Attorney, Agent, or Firm* — Fish & Richardson P.C.

(57) ABSTRACT

Methods, systems, and programs products for license renewal and content chapter access. In one aspect, a method includes receiving a gesture input incident on a touch-sensitive surface to renew a content license, where the license identifies the content and a first period of time during which the content can be accessed. In another aspect, a method includes receiving a gesture input incident on a touch-sensitive surface. In response to the gesture input, a number of chapter indicators for content are presented, each chapter indicator including a thumbnail image and associated with a an offset in the content. In response to a second gesture input, the content from the selected chapter indicator's respective offset is played.

48 Claims, 17 Drawing Sheets

VIDEO CHAPTER ACCESS AND LICENSE RENEWAL

BACKGROUND

Typical graphical user interfaces for video playback are difficult to use when it comes to accessing video chapters, often providing users with few clues as to what content lies in a given chapter. User interfaces for accessing or renewing licenses governing the use of videos commonly lack suitable integration with video playback tools. Short comings with user interfaces for video playback and license renewal are especially apparent on devices having small displays such as portable media players and smart phones.

SUMMARY

In general, one or more aspects of the subject matter described in this specification can be embodied in one or more methods that include receiving gesture input incident on a device's touch-sensitive display to renew a content license, where the license identifies the content and a first period of time during which the content can be accessed. A license renewal request is sent from the device over one or more wireless networks. A license renewal response is received by the device for the request over the one or more wireless networks. The license is renewed based on the renewal response such that the content can be accessed during a second period of time. Other embodiments of this aspect include corresponding systems, apparatus, and computer program products.

These and other embodiments can optionally include one or more of the following features. The device is a portable media player, a mobile phone, a portable electronic game device, or a portable computer. A user is provided advance notification of when the license will expire. The advance notification is provided at a time a user attempts to access or is accessing the content. The license renewal request identifies the content and the license or an account. A format of the content is one of MJPEG, CCIR 601, MPEG-4, MPEG-2, MPEG-1, H.261, H.262, H.263, or H.264. The content is downloaded to the device over the one or more wireless networks. A copy of the content is stored on the device. The content is removed from the device or disabling the content when the license expires.

In general, one or more aspects of the subject matter described in this specification can be embodied in one or more methods that include receiving a first gesture input incident on a display of a touch-sensitive display. In response to the first gesture input, a number of chapter indicators for content are presented, each chapter indicator including a thumbnail image and associated with a an offset in the content. A second gesture input incident on the display is received to select a chapter indicator from the number of chapter indicators. In response to the second gesture input, the content from the selected chapter indicator's respective offset is played. Other embodiments of this aspect include corresponding systems, apparatus, and computer program products.

These and other embodiments can optionally include one or more of the following features. Presenting the list of chapter indicators includes transitioning a presentation of the content to a presentation of the number of chapter indicators. The transition is a flip over animated transition. The first gesture input is incident on an area of the display in which the content is presented. The content is paused in response to the first gesture. The chapter indicators are presented over the content presentation. A control panel is presented on the display configured to allow a user to control the content playback and view the chapter indicators. Each chapter indicator is associated with a name and where the name is presented with an image. Playing the content comprises scaling the selected chapter's respective image and playing the content in a display region occupied by the scaled image. Playing the content comprises in response to the second gesture input, scrubbing playback of the content relative to the selected chapter indicator's respective offset. The playback is presented in a thumbnail image of the selected chapter indicator. The content is processed to create the chapter indicators.

In general, one or more aspects of the subject matter described in this specification can be embodied in one or more methods that include an apparatus comprising a touch-sensitive display and a processor coupled to the touch-sensitive display and configurable for displaying content on the touch-sensitive display. An interface is coupled to the processor and configurable for: a) receiving a first gesture input incident on a display of a touch-sensitive display; b) in response to the first gesture input, presenting a number of chapter indicators for content, each chapter indicator including a thumbnail image and associated with a an offset in the content; c) receiving a second gesture input incident on the display to select a chapter indicator from the number of chapter indicators; and d) in response to the second gesture input, playing the content from the selected chapter indicator's respective offset.

These and other embodiments can optionally include one or more of the following features. Presenting the list of chapter indicators includes transitioning a presentation of the content to a presentation of the number of chapter indicators.

Particular implementations of the subject matter described in this specification can be implemented to realize one or more of the following advantages. Video chapters can be accessed in a convenient fashion by interacting with a playing video or with a control panel. A playing video can be "flipped over" to reveal the video's chapters. Selection of a video chapter can cause the video chapter's thumbnail to zoom out and play the video. For mobile devices with multi-touch-sensitive displays, the video chapter indicators can include the ability to time scrub through the chapter, for example, by gesturing on the chapter thumbnail. A license renewal system keeps track of video licenses and informs users when a license needs to be renewed. Videos can be automatically deleted from mobile devices when their license has expired. Gesture input can easily guide the selection of video chapters and license renewal.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Example Mobile Device

Figure 1A:
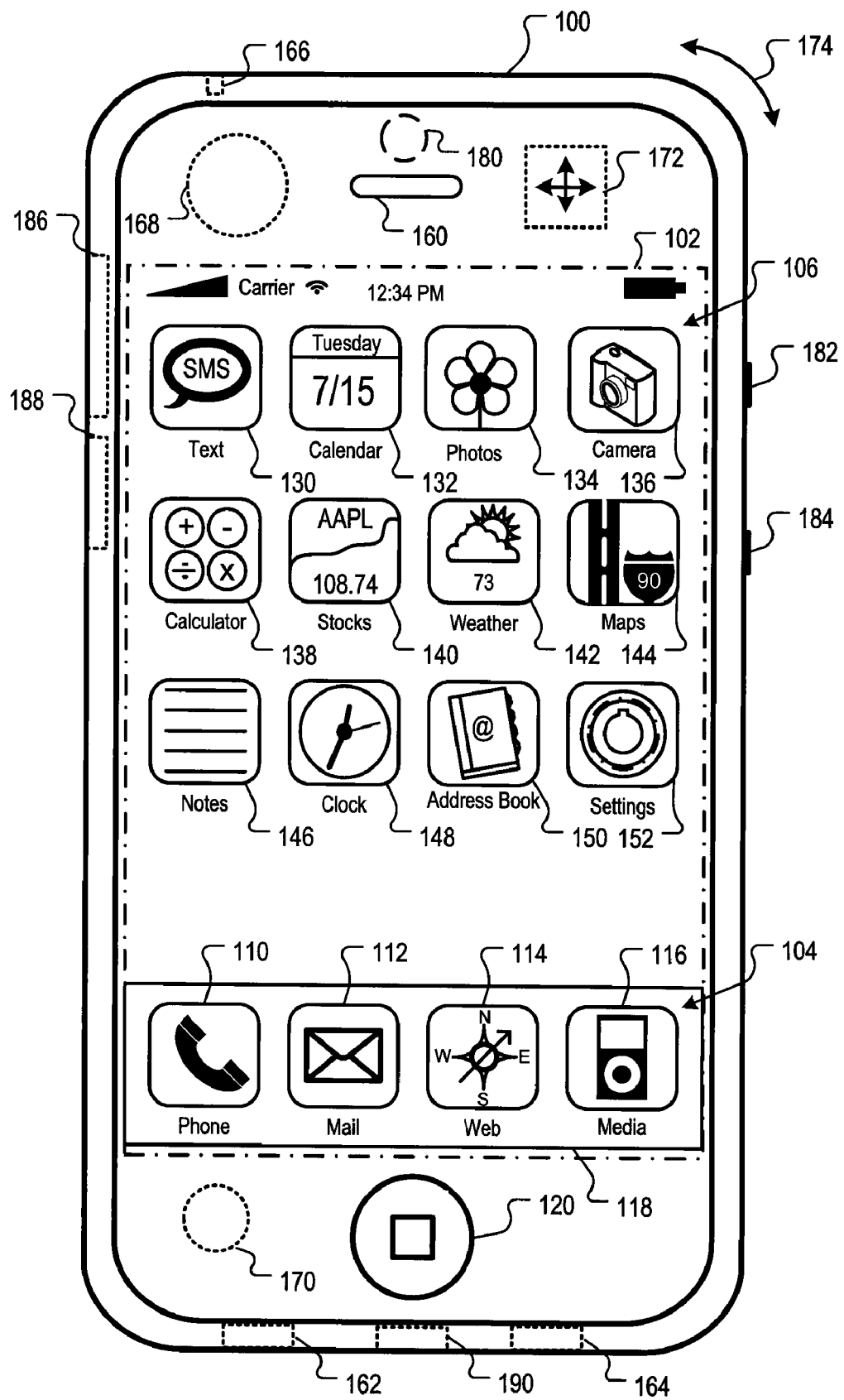
FIG. 1A is a block diagram of an example mobile device.

FIG. 1A is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1A. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1A can be restored by pressing a button 120 located near the bottom of the mobile device 100. In some implementations, each corresponding device functionality may have corresponding "home" display objects displayed on the touch-sensitive display 102, and the graphical user interface environment of FIG. 1A can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the graphical user interface of FIG. 1A. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used, as described in U.S. Provisional Patent Application No. 60/945,904, filed Jun. 22, 2007, for "Multiplexed Data Stream Protocol," which provisional patent application is incorporated by reference herein in its entirety.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Mobile Device

Figure 1B:
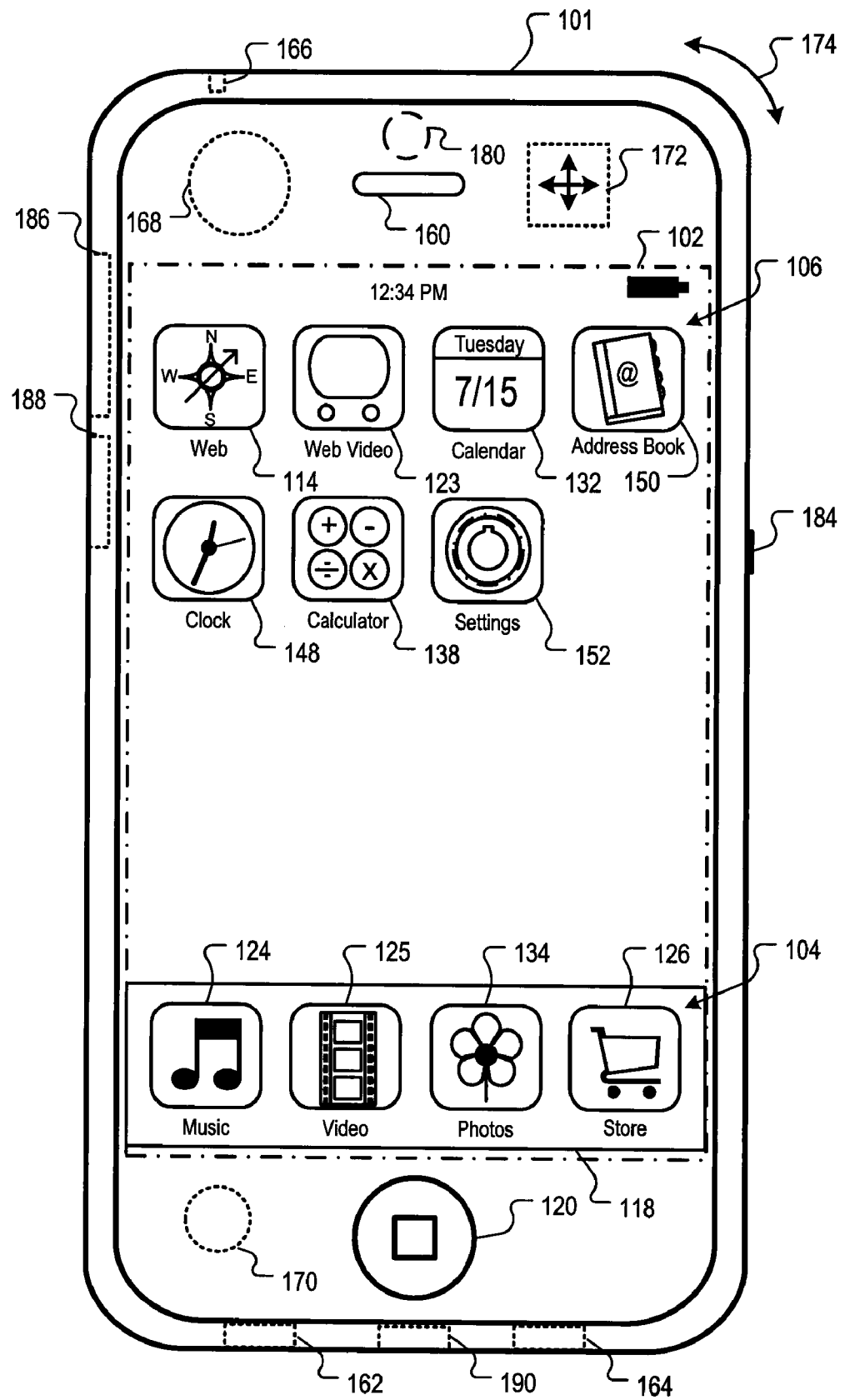
FIG. 1B is a block diagram of an example mobile device.

FIG. 1B is a block diagram of an example mobile device 101. The mobile device 101 can be, for example, a handheld computer, a personal digital assistant, a network appliance, a camera, a network base station, a media player, a navigation device, an email device, a game console, or a combination of any two or more of these data processing devices or other data processing devices. In some implementations, device 101 shown in FIG. 1B is an example of how device 100 can be configured to display a different set of objects. In some implementations, device 101 has a different set of device functionalities than device 100 shown in FIG. 1A, but otherwise operates in a similar manner to device 100.

Mobile Device Overview

In some implementations, the mobile device 101 includes a touch-sensitive display 102, which can be sensitive to haptic and/or tactile contact with a user. In some implementations, the mobile device 101 can display one or more graphical user interfaces on the touch-sensitive display 102 for providing the user access to various system objects and for conveying information to the user.

Mobile Device Functionality

In some implementations, the mobile device 101 can implement multiple device functionalities, such as a music processing device, as indicated by the music player object 124, a video processing device, as indicated by the video player object 125, a digital photo album device, as indicated by the photos object 134, and a network data communication device for online shopping, as indicated by the store object 126. In some implementations, particular display objects 104, e.g., the music player object 124, the video player object 125, the photos object 134, and store object 126, can be displayed in a menu bar 118. In some implementations, device functionalities can be accessed from a top-level graphical user interface, such as the graphical user interface illustrated in FIG. 1B. Touching one of the objects 124, 125, 134, or 126 can, for example, invoke corresponding functionality.

In some implementations, the top-level graphical user interface of mobile device 101 can include additional display objects 106, such as the Web object 114, the calendar object 132, the address book object 150, the clock object 148, the calculator object 138, and the settings object 152 described above with reference to mobile device 100 of FIG. 1A. In some implementations, the top-level graphical user interface can include other display objects, such as a Web video object 123 that provides functionality for uploading and playing videos on the Web. Each selection of a display object 114, 123, 132, 150, 148, 138, and 152 can invoke a corresponding object environment and functionality.

Additional and/or different display objects can also be displayed in the graphical user interface of FIG. 1B. In some implementations, the display objects 106 can be configured by a user. In some implementations, upon invocation of device functionality, the graphical user interface of the mobile device 101 changes, or is augmented or replaced with another user interface or user interface elements, to facilitate user access to particular functions associated with the corresponding device functionality.

In some implementations, the mobile device 101 can include one or more input/output (I/O) devices 160, 162, 164, and 166, a volume control device 184, sensor devices 168, 170, 172, and 180, wireless communication subsystems 186 and 188, and a port device 190 or some other wired port connection described above with reference to mobile device 100 of FIG. 1A.

Network Operating Environment

Figure 2:
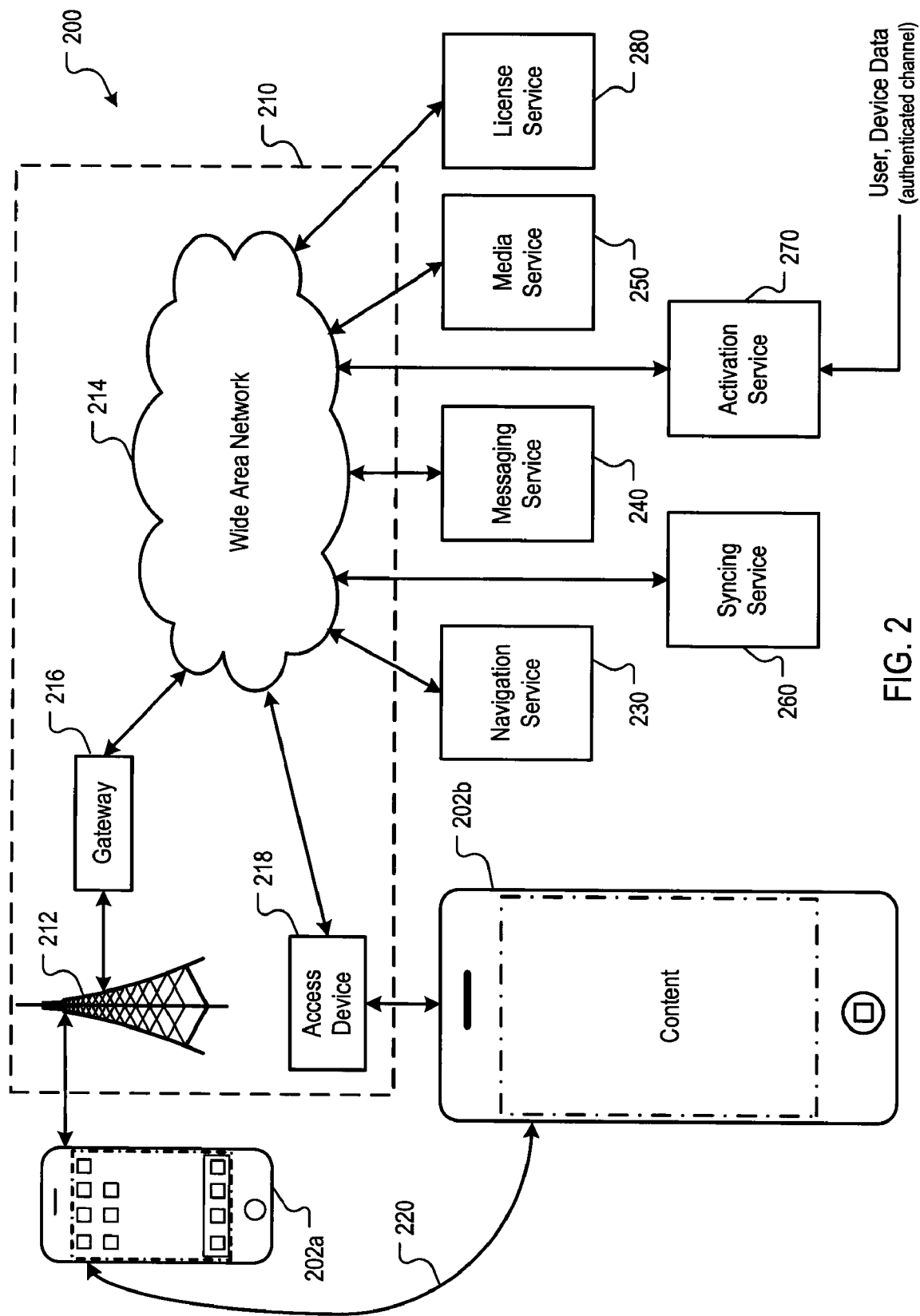
FIG. 2 is a block diagram of an example network operating environment for the mobile devices of FIGS. 1A-1B.

FIG. 2 is a block diagram of an example network operating environment 200. In FIG. 2, mobile devices 202a and 202b each can represent mobile device 100 or 101. Mobile devices 202a and 202b can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214. In some implementations, both voice and data communications can be established over the wireless network 212 and the access device 218. For example, the mobile device 202a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, in some implementations, the mobile device 202b can place and receive phone calls, send and receive e-mail messages, and retrieve electronic documents over the access device 218 and the wide area network 214. In some implementations, the mobile device 202a or 202b can be physically connected to the access device 218 using one or more cables and the access device 218 can be a personal computer. In this configuration, the mobile device 202a or 202b can be referred to as a "tethered" device.

The mobile devices 202a and 202b can also establish communications by other means. For example, the wireless device 202a can communicate with other wireless devices, e.g., other mobile devices 202a or 202b, cell phones, etc., over the wireless network 212. Likewise, the mobile devices 202a and 202b can establish peer-to-peer communications 220, e.g., a personal area network, by use of one or more communication subsystems, such as the Bluetooth™ communication devices 188 shown in FIGS. 1A-1B. Other communication protocols and topologies can also be implemented.

The mobile device 202a or 202b can, for example, communicate with one or more services 230, 240, 250, 260, and 270 over the one or more wired and/or wireless networks 210. For example, a navigation service 230 can provide navigation information, e.g., map information, location information, route information, and other information, to the mobile device 202a or 202b. A user of the mobile device 202b can invoke a map functionality, e.g., by pressing the maps object 144 on the top-level graphical user interface shown in FIG. 1A, and can request and receive a map for a particular location.

A messaging service 240 can, for example, provide e-mail and/or other messaging services. A media service 250 can, for example, provide access to media files, such as song files, audio books, movie files, video clips, and other media data. In some implementations, separate audio and video services (not shown) can provide access to the respective types of media files. A syncing service 260 can, for example, perform syncing services (e.g., sync files). An activation service 270 can, for example, perform an activation process for activating the mobile device 202a or 202b. Other services can also be provided, including a software update service that automatically determines whether software updates exist for software on the mobile device 202a or 202b, then downloads the software updates to the mobile device 202a or 202b where the software updates can be manually or automatically unpacked and/or installed.

The mobile device 202a or 202b can also access other data and content over the one or more wired and/or wireless networks 210. For example, content publishers, such as news sites, RSS feeds, web sites, blogs, social networking sites, developer networks, etc., can be accessed by the mobile device 202a or 202b. Such access can be provided by invocation of a web browsing function or application (e.g., a browser) in response to a user touching the Web object 114.

Example Mobile Device Architecture

Figure 3:
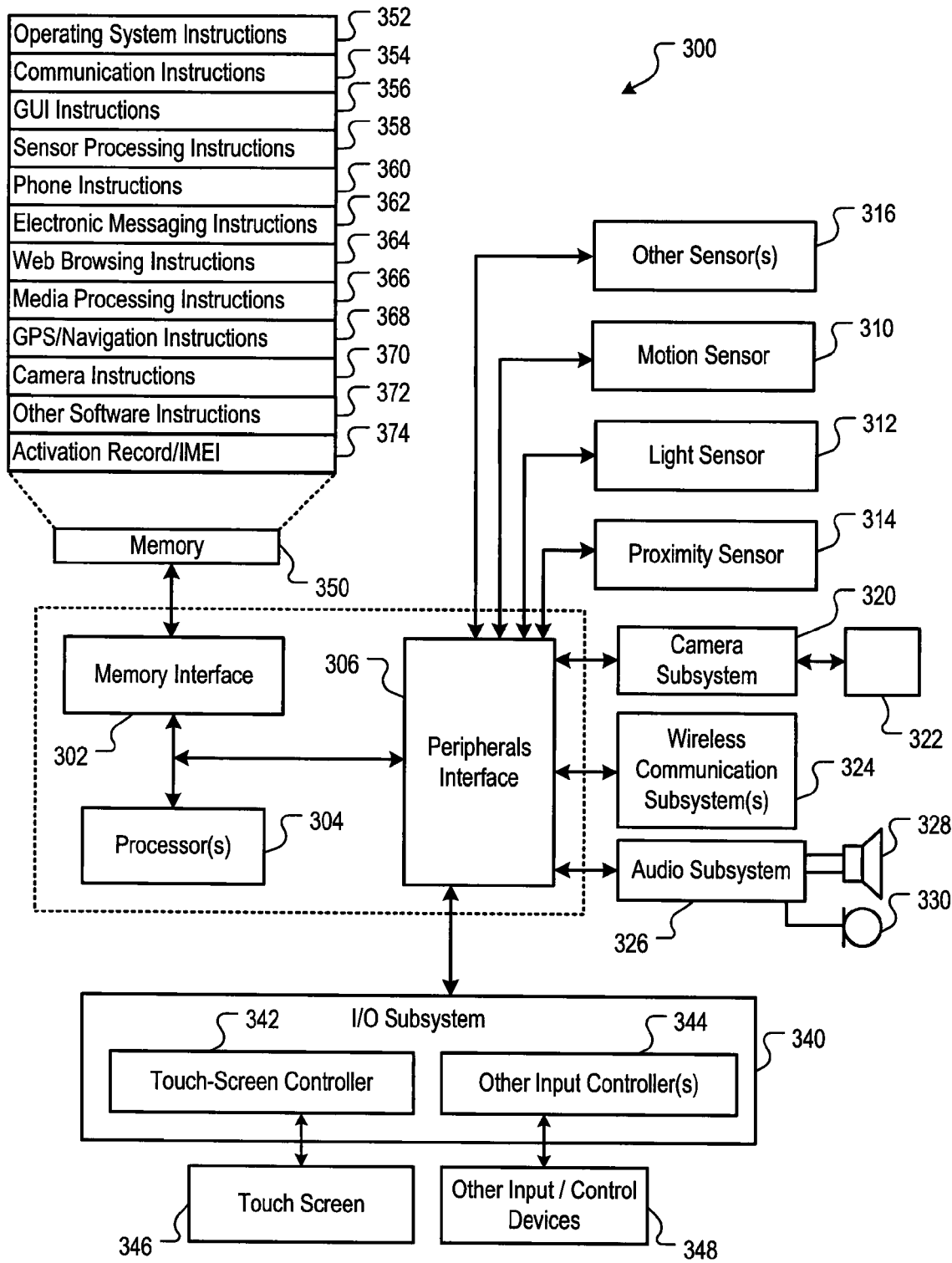
FIG. 3 is a block diagram of an example implementation of the mobile devices of FIGS. 1A-1B.

FIG. 3 is a block diagram 300 of an example implementation of the mobile devices 100 and 101 of FIGS. 1A-1B, respectively. The mobile device 100 or 101 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 or 101 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 1A. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 or 101 is intended to operate. For example, a mobile device 100 or 101 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 or 101 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 or 101 on or off. The user may be able to customize a functionality of one or more of the buttons. The touch screen 346 can, for example, also be used to implement virtual or soft buttons and/or a keyboard.

In some implementations, the mobile device 100 or 101 can present recorded audio and/or video files, such as MP3, AAC, and MPEG files. In some implementations, the mobile device 100 or 101 can include the functionality of an MP3 player, such as an iPod™. The mobile device 100 or 101 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel), as described in reference to FIGS. 4A and 4B.

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., security processes and functions as described in reference to FIGS. 4A and 4B. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 or 101 may be implemented in hardware and/or in software, including in one or more signal processing and/or application specific integrated circuits.

Software Stack and Security Process

Figure 4A:
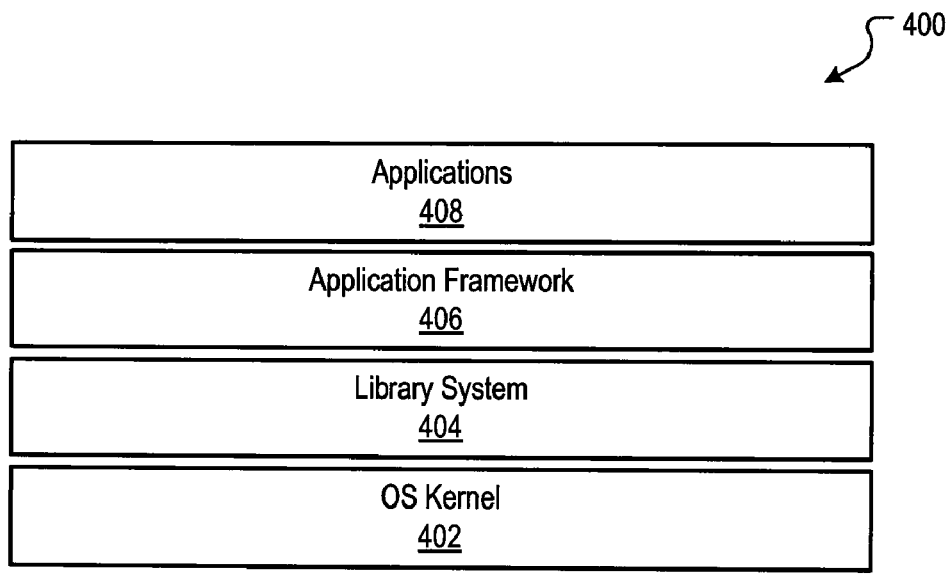
FIG. 4A illustrates an example implementation of a software stack for the mobile devices of FIGS. 1A-1B

FIG. 4A illustrates an example implementation of a software stack 400 for the mobile devices of FIGS. 1A-1B. In some implementations, the software stack 400 includes an operating system (OS) kernel 402 (e.g., a UNIX kernel), a library system 404, an application framework 406 and an applications layer 408.

The OS kernel 402 manages the resources of the mobile device 100 or 101 and allows other programs to run and use these resources. Some examples of resources include a processor, memory, and I/O. For example, the kernel 402 can determine which running processes should be allocated to a processor, processors or processor cores, allocates memory to the processes and allocates requests from applications and remote services to perform I/O operations. In some implementations, the kernel 402 provides methods for synchronization and inter-process communications with other devices.

In some implementations, the kernel 402 can be stored in non-volatile memory of the mobile device 100 or 101. When the mobile device 100 or 101 is turned on, a boot loader starts executing the kernel 102 in supervisor mode. The kernel then initializes itself and starts one or more processes for the mobile device 100 or 101, including a security process 410 for remote access management, as described in reference to FIG. 4B.

The library system 404 provides various services applications running in the application layer 408. Such services can include audio services, video services, database services, image processing services, graphics services, etc.

The application framework 406 provides an object-oriented application environment including classes and Application Programming Interfaces (APIs) that can be used by developers to build applications using well-known programming languages (e.g., Objective-C, Java).

The applications layer 408 is where various applications exist in the software stack 400. Developers can use the APIs and environment provided by the application framework 406 to build applications, such as the applications represented by the display objects 104, 106, shown in FIGS. 1A-1B (e.g., email, media player, Web browser, phone, music player, video player, photos, and store).

Secure Communication Channel

Figure 4B:
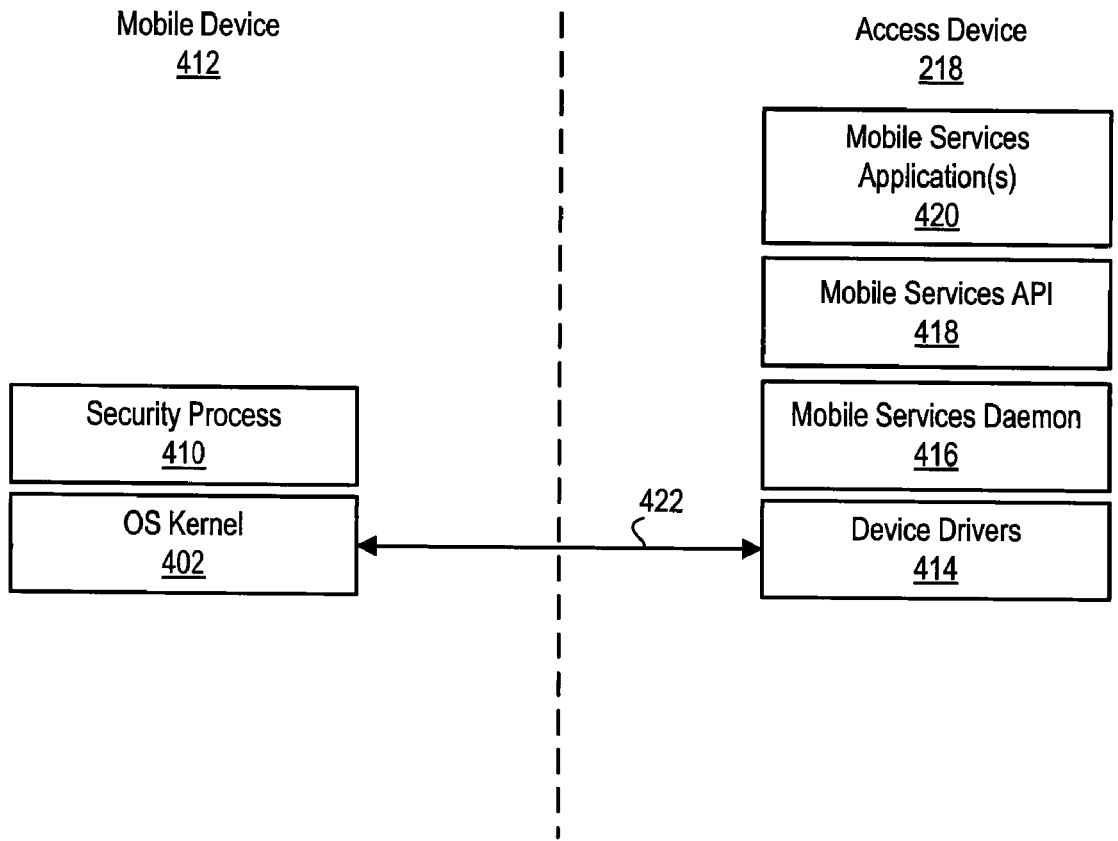
FIG. 4B illustrates an example implementation of a security process for remote access management over a secure communications channel.

FIG. 4B illustrates an example implementation of a security process 410 for remote access management over a secure communications channel 422. In the example shown, the mobile device 412, e.g., mobile device 100 or 101, is running the security process 410, which communicates with the OS kernel 402. Any remote access requests made to the kernel 402 are intercepted by the security process 410, which is responsible for setting up secure communication sessions between the mobile device 412 and a mobile services access device 218. In some implementations, the process 410 uses a cryptographic protocol, such as Secure Sockets Layer (SSL) or Transport Layer Security (TLS) to provide secure communications between the mobile device 412 and the access device 218. The access device 218 can be any device with network connectivity, including but not limited to: a personal computer, a hub, an Ethernet card, another mobile device, a wireless base station, etc. The secure communications channel can be a Universal Serial Bus (USB), Ethernet, a wireless link (e.g., Wi-Fi, WiMax, 3G), an optical link, infrared link, FireWire™, or any other known communications channel or media.

In the example shown, the access device 218 includes device drivers 414, a mobile services daemon 416, a mobile services API 418 and one or more mobile service applications 420. The device drivers 414 are responsible for implementing the transport layer protocol, such as TCP/IP over USB. The mobile services daemon 416 listens (e.g., continuously) to the communications channel 422 for activity and manages the transmission of commands and data over the communication channel 422. The mobile services API 418 provides a set of functions, procedures, variables and data structures for supporting requests for services made by the mobile services application 420. The mobile services application 420 can be a client program running on the access device 218, which provides one or more user interfaces for allowing a user to interact with a remote service (e.g., activation service 270) over a network (e.g., the Internet, wireless network, peer-to-peer network, optical network, Ethernet, intranet). In some implementations, a device activation process can be used, as described in co-pending U.S. patent application Ser. No. 11/767,447, filed Jun. 22, 2007, for "Device Activation and Access," which patent application is incorporated by reference herein in its entirety. The application 420 can allow a user to set preferences, download or update files of content or software, search databases, store user data, select services, browse content, perform financial transactions, or engage in any other online service or function. An example of a mobile services application 420 is the iTunes™ client, which is publicly available from Apple Inc. (Cupertino, Calif.). An example of a mobile device 412 that uses the iTunes™ client is the iPod™ product developed by Apple Inc. Another example of a mobile device 412 that uses the iTunes™ client is the iPhone™ product developed by Apple Inc.

In an example operational mode, a user connects the mobile device 412 to the access device 218 using, for example, a USB cable. In other implementations, the mobile device 412 and access device 218 include wireless transceivers for establishing a wireless link (e.g., Wi-Fi). The drivers 414 and kernel 408 detect the connection and alert the security process 410 and mobile services daemon 416 of the connections status. Once the connection is established certain non-sensitive information can be passed from the mobile device 412 to the access device 218 (e.g., name, disk size, activation state) to assist in establishing a secure communication session.

In some implementations, the security process 410 establishes a secure communication session (e.g., encrypted SSL session) with the access device 218 by implementing a secure network protocol. For example, if using SSL protocol, the mobile device 412 and access device 218 will negotiate a cipher suite to be used during data transfer, establish and share a session key, and authenticate the access device 218 to the mobile device 412. In some implementations, if the mobile device 412 is password protected, the security process 410 will not establish a session, and optionally alert the user of the reason for failure.

Once a secure session is successfully established, the mobile device 412 and the access device 218 can exchange sensitive information (e.g., passwords, personal information), and remote access to the mobile device 412 can be granted to one or more services (e.g., navigation service 230, messaging service 240, media service 250, syncing service 260, activation service 270). In some implementations, the mobile services daemon 416 multiplexes commands and data for transmission over the communication channel 422. This multiplexing allows several remote services to have access to the mobile device 412 in a single session without the need to start a new session (or handshaking) for each service requesting access to the mobile device 412.

Figure 5A:
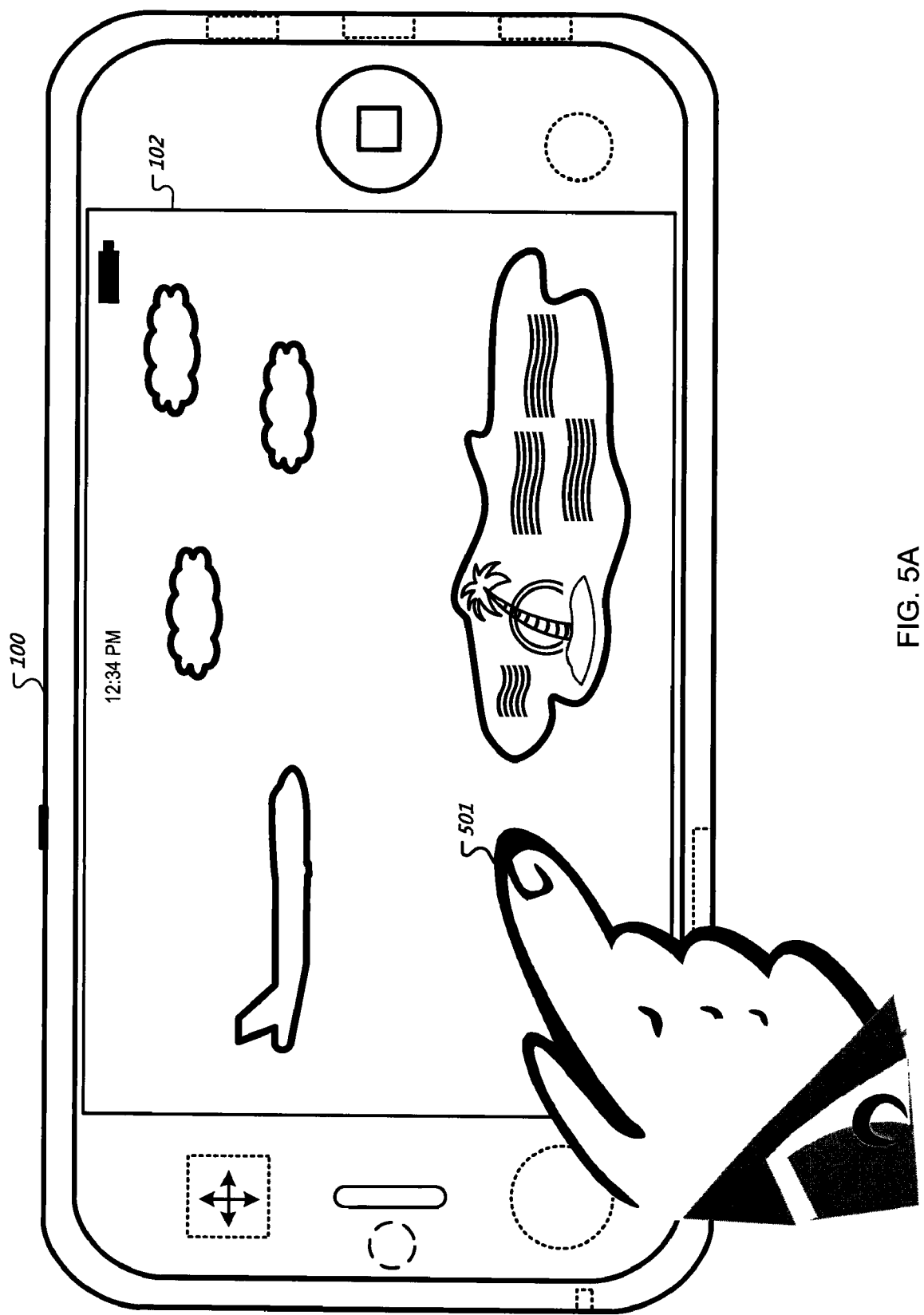
FIG. 5A illustrates a mobile device displaying example video content.

FIG. 5A illustrates the mobile device 100 displaying example video or other visual content (e.g., slideshow, digital photos, broadcasts) on the display 102. Video content can be video which includes moving pictures, such as a movie or video clip and accompanying sounds. Video content can be received, for example, from the media service 250, over the network 214, and stored on the mobile device 100. As other examples, video content can also be received in association with the web video object 123 or the camera 136. The format of the video can be MJPEG, CCIR 601, MPEG-4, MPEG-2, MPEG-1, H.261, H.262, H.263, or H.264, for example.

A user can provide a gesture input, which can be incident or near on the display 102, to indicate that they want to bring up a control panel. The gesture input, which can be incident on the display 102, can be a tap (e.g., with a finger 501 or a stylus), a double-tap, a tap and a slide, a squeeze or press, a pulling apart of two fingers, or some other gesture. In response to the gesture, a control panel can be displayed, as will be described next.

Figure 5B:
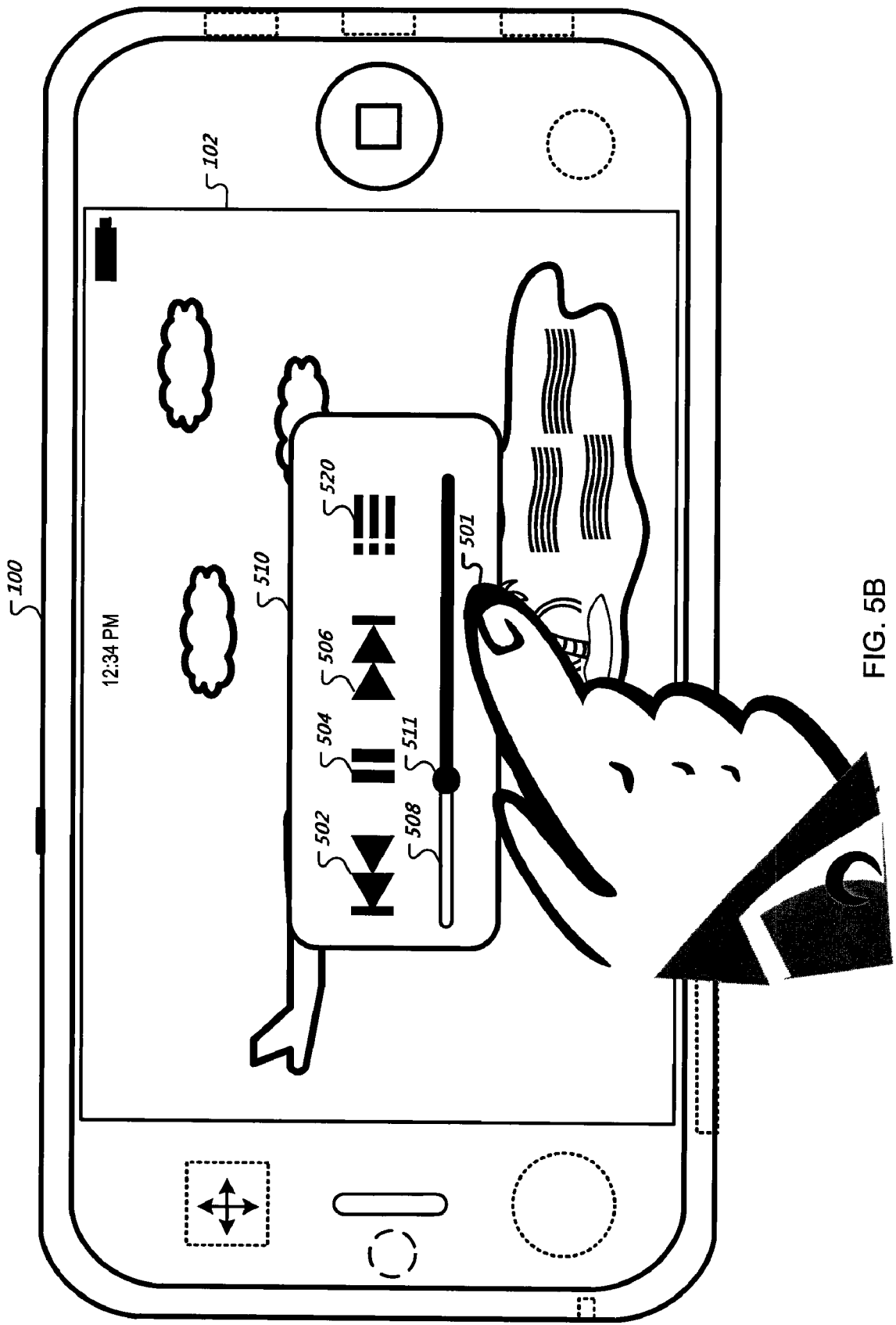
FIG. 5B illustrates an example control panel user interface.

FIG. 5B illustrates an example control panel user interface 510. The control panel 510 can be displayed on top of content on the display 102 (e.g., video) and can appear in response to, for example, a gesture input, as described previously with respect to FIG. 5A. The control panel 510 can be opaque or semi-transparent (i.e., the visual content playing behind the control panel 510 on the display 102 can be partially seen by the user). When the control panel 510 appears, the content playback can be paused, or the visual content can remain (e.g., static or playing). The control panel 510 can include controls to control the content playback. Content playback can be paused and resumed by user selection of the pause/play control 504. The visual content can be rewound at various speeds by user selection of a rewind control 502. Likewise, the visual content can be fast-forwarded at various speeds by user selection of a fast forward control 506. A jog control 508 allows a user to time scrub through the content by moving the jog control's 508 slider 511 forward or back.

The content can be divided into adjacent or non-adjacent periods of time called chapters. For example, each chapter can represent a section of a video and each chapter can have an associated time or frame offset within the video. Chapters can be predetermined (e.g., by the video content producer or distributor) or the video can be processed at runtime to determine chapters. For example, the video content can be divided into chapters of equal length. Chapters may also be determined based on automatic recognition of when scene or location changes occur in the video.

The control panel 510 can include a chapter indicator control 520. If the user selects the chapter indicator control 520 or performs an equivalent gesture, a list of chapter indicators can be presented, as will be described next.

Figure 5C:
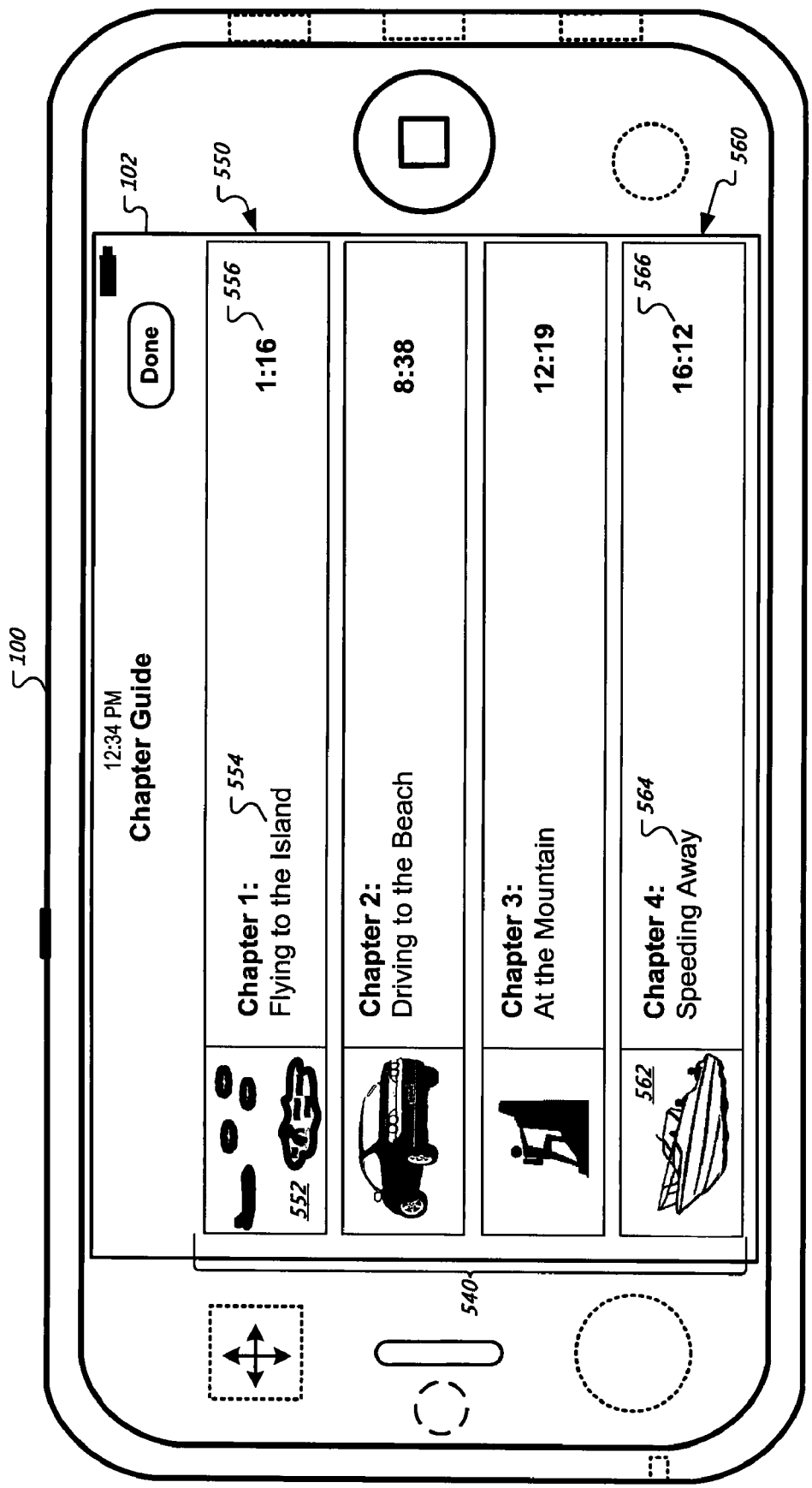
FIG. 5C illustrates an example chapter indicator list.

FIG. 5C illustrates an example chapter indicator list 540 displayed on the display 102. The chapter indicator list 540 can be displayed, for example, in response to selection of the chapter indicator control 520, as discussed previously with respect to FIG. 5B. In some implementations, the chapter indicator list 540 can be presented over the content presentation (e.g., the chapter indicator list can be semi-transparent).

The chapter indicator list 540 can display a set of chapter indicators, where each chapter indicator can include a thumbnail image, a chapter name and a time offset within the video, for example. Chapter indicators can also be displayed in other forms such as thumbnail images or chapter names without images, for example. In this example, chapter indicator 550 in the chapter indicator list 540 includes a thumbnail image 552, a chapter name 554 of "Flying to the Island", and a time offset 556 of "1:16". And a chapter indicator 560 includes a thumbnail image 562, a chapter name 564 of "Speeding Away", and a time offset 566 of "16:12". The chapter indicator list 540 is scrollable through user gestures on display 102 or other means. In various implementations, user selection of any part of a chapter indicator will cause the movie to be played beginning at the time offset associated with the selected chapter indicator.

A thumbnail image (e.g., 552, 562) is a still image of a video frame representing the chapter. The thumbnail image can be a scaled version of the a non-blank (e.g., non-black) frame within the chapter, for example. Alternatively, a thumbnail image can be selected from all of the frames in the chapter based on a determination as to whether a certain frame conveys enough information to be a visual representation of the chapter. In another alternative, a thumbnail image is an image other than a frame in the chapter. Other thumbnail images are possible, such as animated thumbnail images or thumbnail images that "loop" through one or more sequences of a movie or all frames of a movie, thereby playing the movie.

Figure 6A:
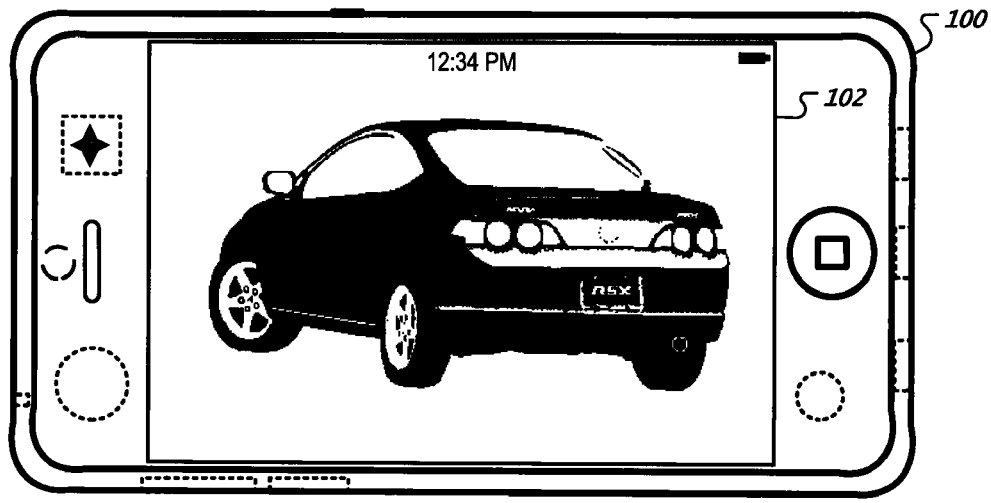
FIGS. 6A-6C illustrate a flip-over user interface.
Figure 6B:
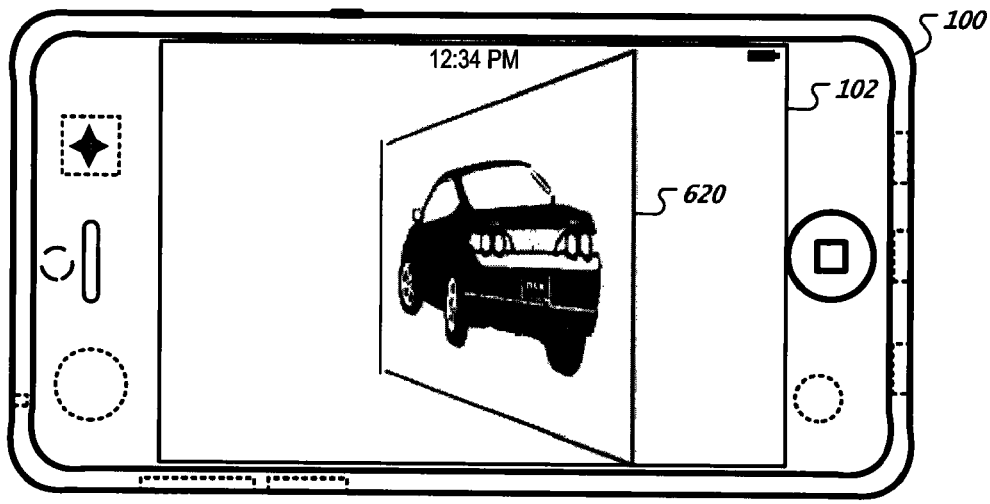
Figure 6C:
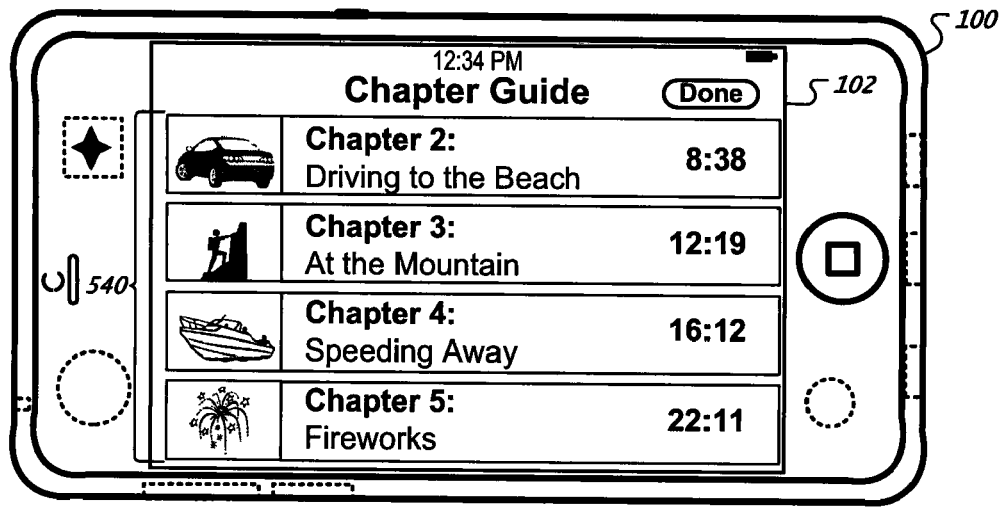

FIGS. 6A-6C illustrate an example flip-over user interface. FIG. 6A illustrates a video playing in the display 102. In some implementations, the chapter indicator list 540 can be displayed (e.g. in response to a gesture, such as a tap incident on the display 102) in a flip-over user interface. The flip-over user interface can be displayed through a flip-over animation. For example, the video can rotate as it is playing, either clockwise or counterclockwise, about the Y-axis, as illustrated by the partially-rotated video 620 shown in FIG. 6B. The video can rotate in other ways, such as about the X axis. Alternatively, other visual effects can be applied to the playing video to transform it to a chapter indicator list 540 (e.g., morphing). When the video has rotated 180 degrees, the animation can display the "back side" of the video. In other words, the chapter indicator list 540 can appear, as if on the back-side of the video, once the rotation has completed, as shown in FIG. 6C. The user can select a chapter indicator, as discussed previously with respect to FIG. 5C. In response to the selection of a chapter indicator, the chapter indicator list 540 can "flip back over", and the video can be played as shown in FIG. 6A, with the playback starting at the offset associated with the selected chapter. Other animated transitions can also be used to transition between the video and the chapter indicator list 540, such as fade in/fade out, wipes, genie effect, etc.

Figure 7:
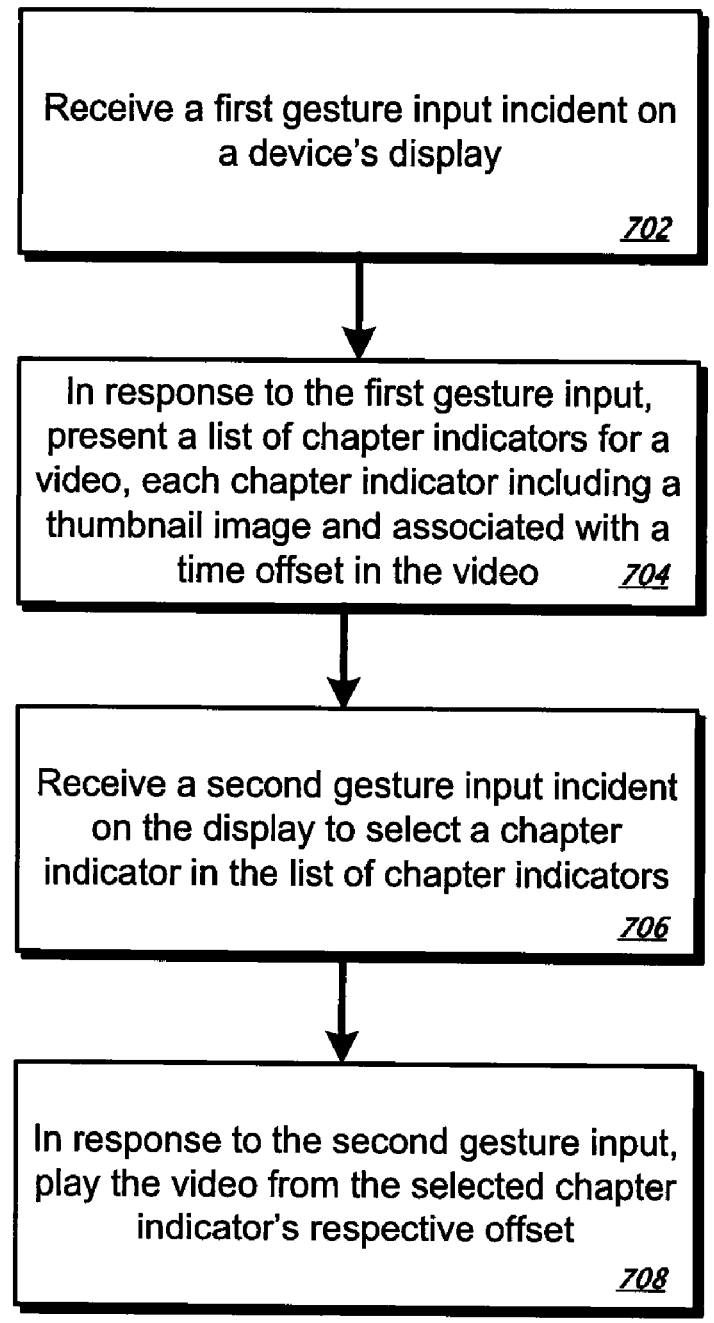
FIG. 7 is a flowchart of an example method for playing video content starting from a chapter associated with a selected chapter indicator.

FIG. 7 is a flowchart of an example method 700 for playing video content starting from a chapter associated with a selected chapter indicator. A first gesture input incident on a device's display is received (step 702). For example, a user can touch the display 102 of the mobile device 100 with one or more fingers or a stylus, as described previously with respect to FIG. 6A. As another example, the user can touch the chapter indicator control 520, described previously with respect to FIG. 5B. The first gesture input can be detected, for example, by the touch screen 346 and touch screen controller 342.

In response to the first gesture input, a list of chapter indicators for a video is presented, with each chapter indicator including a thumbnail image and associated with a time offset in the video (step 704). For example, the chapter indicator list 540 can be displayed, as previously discussed with respect to FIG. 5C. The displayed list of chapter indicators can include one or more chapter indicators, such as the chapter indicator 550, which includes a thumbnail image 552, a time offset 556 and a chapter name 554, or the chapter indicator 560, which includes a thumbnail image 562, a time offset 566, and a chapter name 564. As discussed previously with respect to FIG. 5B, the chapters in the video can be predetermined or can be determined at runtime.

A second input (e.g., gesture input incident on the display) is received to select a chapter indicator in the list of chapter indicators (step 706). For example, the chapter indicator 550 or chapter indicator 560 can be selected from the chapter indicator list 540, as discussed previously with respect to FIG. 5C. The second input can be detected, for example, by the touch screen 346 and touch screen controller 342.

In response to the second input, the video is played from the selected chapter indicator's respective offset (step 708). For example, if the chapter indicator 550 is the selected chapter indicator, the associated video can be played from the respective offset 556 (i.e., the video can be played starting at the time offset of "1:16"). As another example, if the chapter indicator 560 is the selected chapter indicator, the video can be played from the respective offset (i.e., the video can be played starting at the time offset of "16:12"). The video can be played, for example, using functionality found in the media processing instructions 366. As another example, the video can be played using the media player object 116 and/or the video player object 125. In some implementations, the video can be played using a different video-playing application included in the applications 408.

Figure 8:
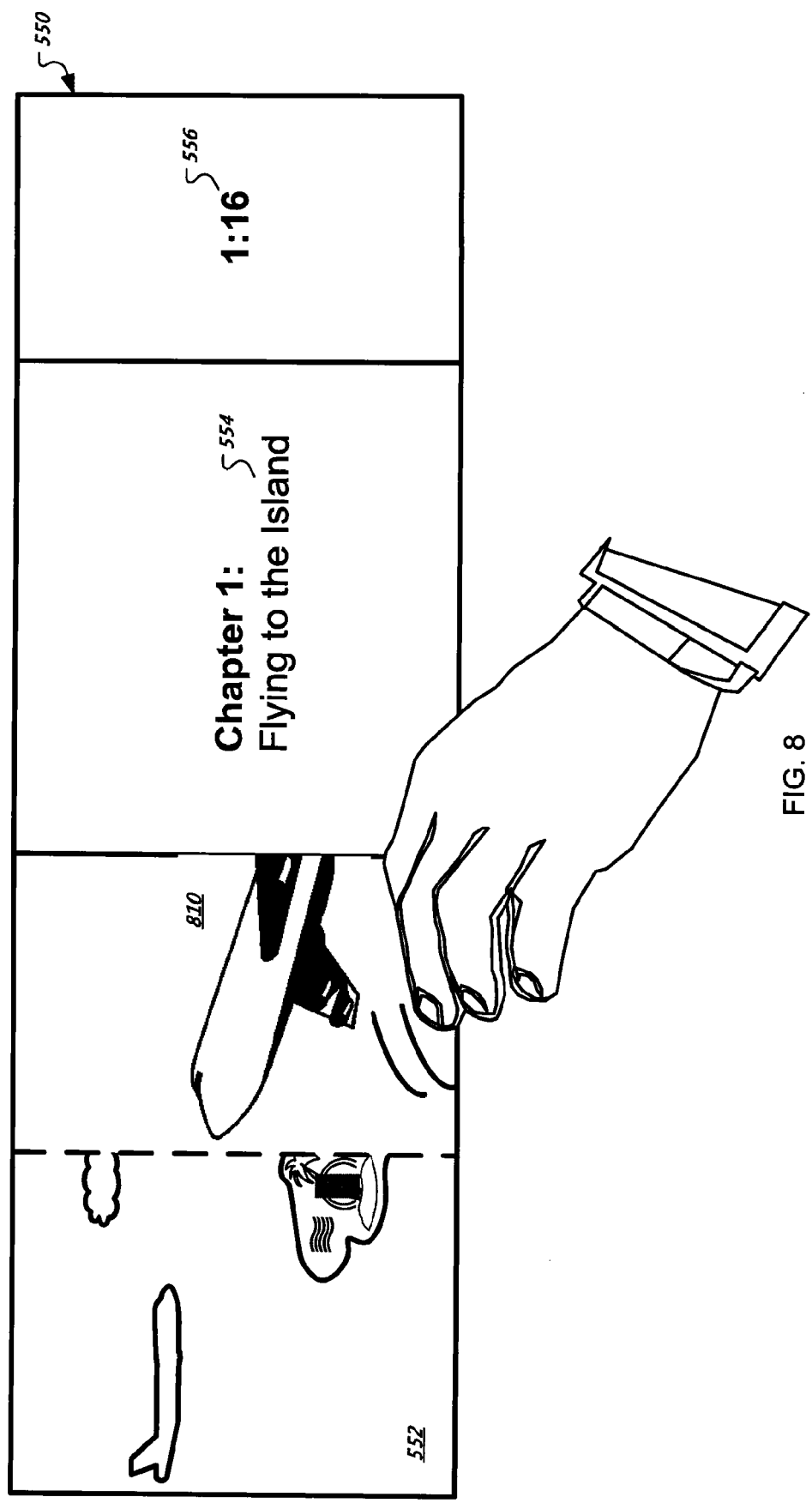
FIG. 8 illustrates an example chapter indicator.

FIG. 8 illustrates an example chapter indicator 550. As previously discussed, the chapter indicator 550 can include a chapter name 554 and a time offset 556 within the associated video. The chapter indicator 550 can be displayed in the chapter indicator list 540, as previously discussed with respect to FIG. 5C. The chapter indicator 550 can include a thumbnail image 552 representing the chapter. The thumbnail image can be a frame from the chapter. If a user is not sure what is in a chapter based on the initially-displayed thumbnail image, the user can move through (i.e., "time scrub" through) additional thumbnail images to view additional video frames of the chapter. The user can scrub by, for example, gesturing, such as by sliding a finger or multiple fingers in a right-to-left or left-to-right direction on the display 102. The speed of the scrubbing can be controlled by the speed of the gestures made by the user.

The chapter indicator 550 can display thumbnail images representing different frames in response to the scrubbing gestures of the user. For example, if the user provides a right-to-left gesture, the chapter indicator 550 can display a thumbnail image representing the next frame in the chapter. If the user provides a left-to-right gesture, the chapter indicator 550 can display a thumbnail image representing the previous frame in the chapter. The chapter indicator here shows a transition between the first frame of a chapter (represented by the partial thumbnail image 552), and a later frame in the chapter (represented by the partial thumbnail image 810). For example, the user may have gestured in a right-to-left fashion, and in response to the gesture, the current thumbnail image (i.e., 552) is being replaced with a thumbnail image (i.e., 810) representing the next frame. The thumbnail image 810 will continue to move leftward and will replace the thumbnail image 552.

Figure 9:
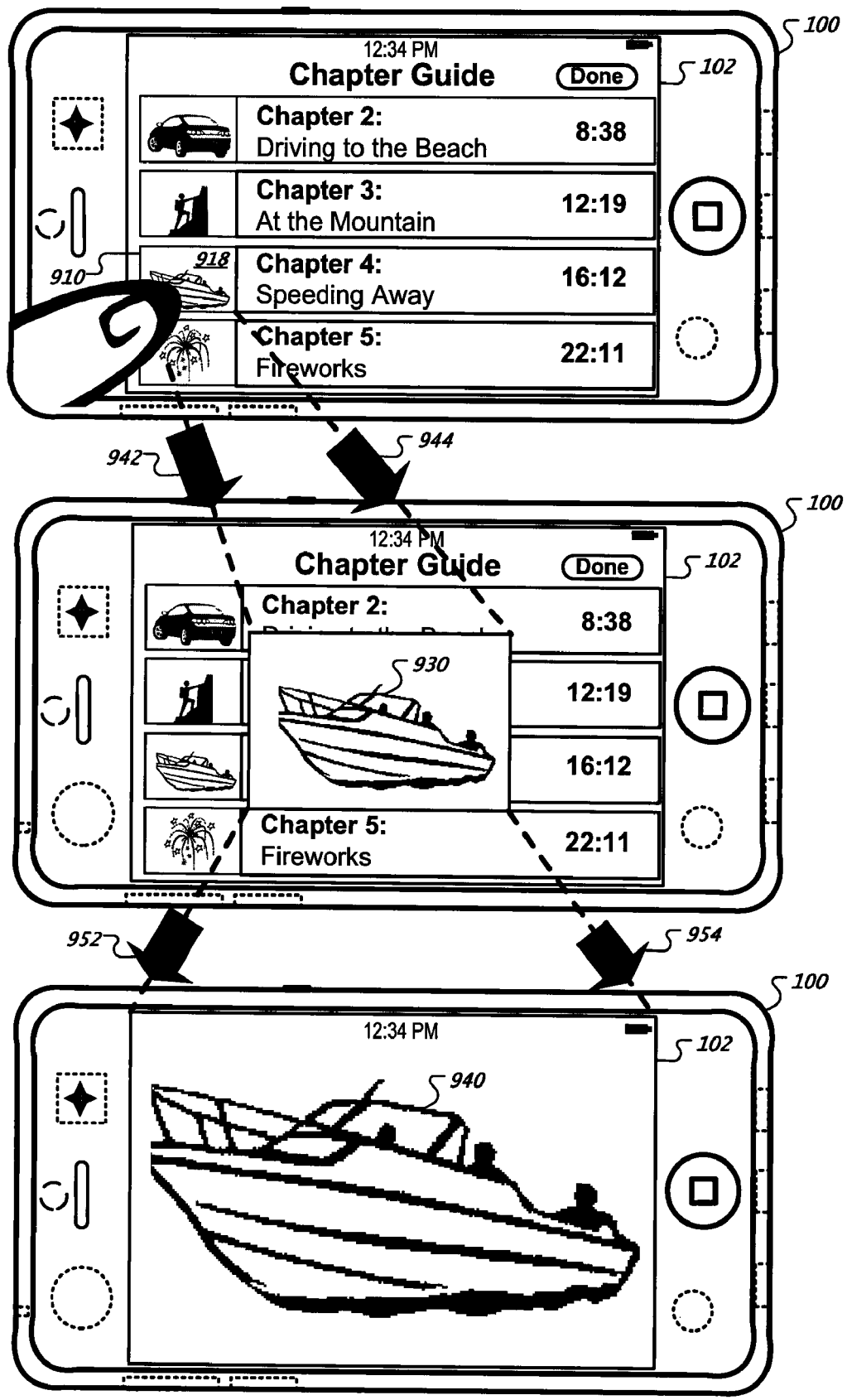
FIG. 9 illustrates a zoom-out of a thumbnail image to a full-sized image.

FIG. 9 illustrates an example zoom-out of a thumbnail image to a fall-sized image. As discussed earlier, the user can select a chapter indicator (e.g., chapter indicator 910) to play an associated video starting from the chapter associated with the selected chapter indicator. In some implementations, in response to the selection of a chapter indicator, the thumbnail image associated with the selected chapter indicator (e.g., thumbnail image 918) can be scaled (e.g., be expanded, or "zoomed-out") to a full-sized image. The playback of the video at the chapter associated with the thumbnail image can start after the thumbnail image has been scaled. Other effects in response to selection indicator are possible.

The image 930 illustrates a partial expansion of the thumbnail image 918, and the image 940 illustrates the thumbnail image 918 expanded to a full-sized video image (i.e., the thumbnail image is expanded to a size which occupies the display 102). An expansion of the thumbnail image 918 over time is illustrated in FIG. 9 by a transition (illustrated by arrows 942-944) from the thumbnail image 918 to the partially-enlarged image 930, followed by a transition (illustrated by arrows 952-954) to the full-sized image 940. The zoom-out, or expansion can appear to the user as a smooth animation of the enlarging of the thumbnail image 918 to its full size (i.e., the thumbnail image 918 can smoothly "grow" increasingly in size over time until it reaches full size as shown in the image 940). Other animated transitions are also possible.

Figure 10:
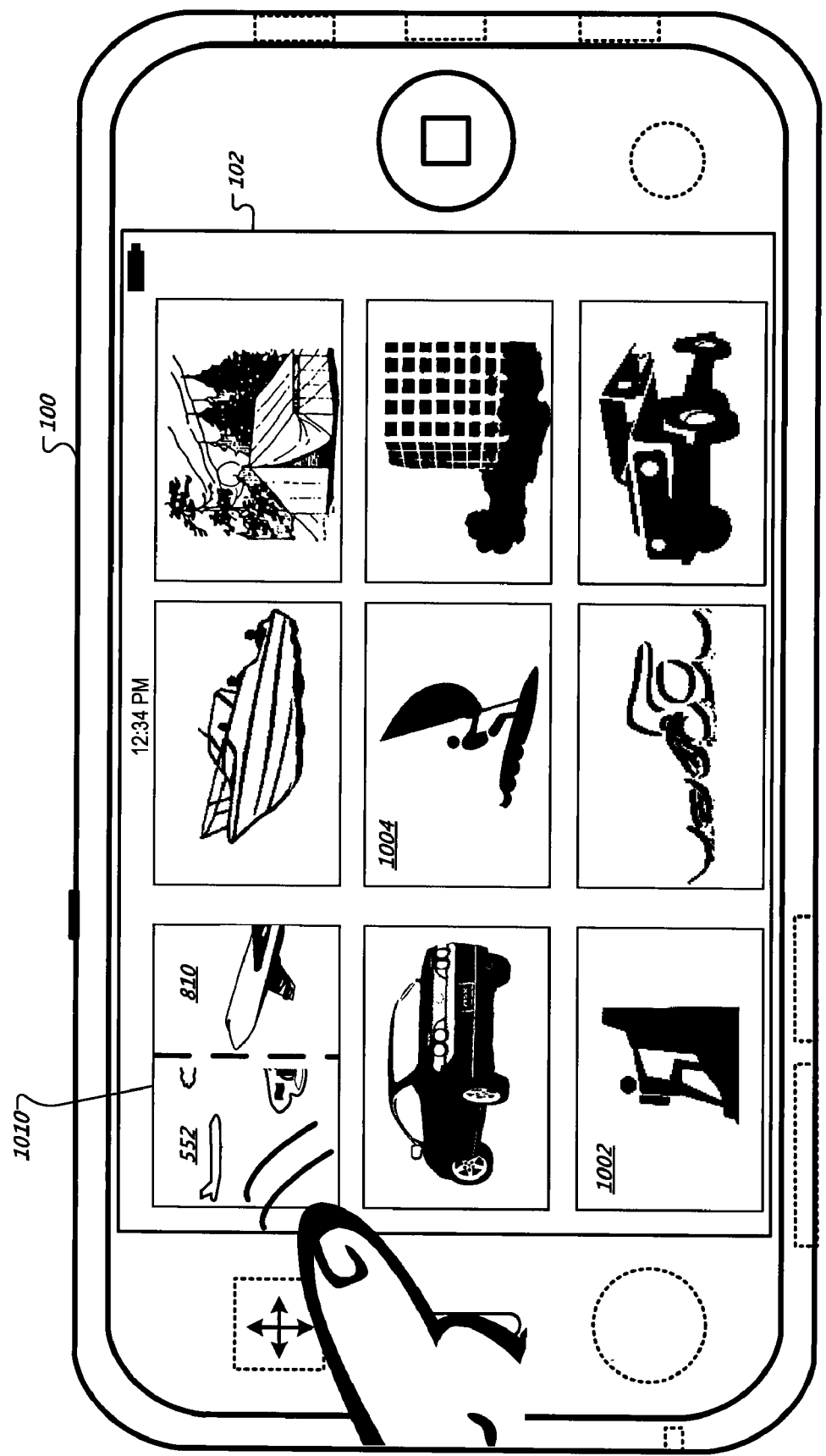
FIG. 10 illustrates an example user interface displaying a grid of thumbnail images.

FIG. 10 illustrates an example user interface displaying a grid of thumbnail images. In some implementations, thumbnail images representing video chapters can be displayed in a grid, such as the 3×3 grid of thumbnail images shown in FIG. 10. Other grid arrangements are possible, such as displaying the thumbnail images using a different number of rows and columns. The user can scroll (e.g., by gesturing to indicate an up, down, left, right or diagonal direction) to see additional thumbnail images not currently visible in the display 102.

The user can select a thumbnail image displayed in the grid (e.g., by tapping on the thumbnail image or by selecting the thumbnail image through some other gesture). For example, the user can select a thumbnail image 1002 or a thumbnail image 1004. The video can play in-place in the selected thumbnail image, starting from the chapter represented by the selected thumbnail image. As another example, the selected thumbnail image can expand, or "zoom-out", as described previously with respect to FIG. 9, and the video can play full-screen, starting from the chapter represented by the selected thumbnail image. The user can provide a gesture input (such as sliding a finger across a thumbnail image) to scrub through frames of a chapter, as illustrated by the transition from the frame represented by the partial thumbnail image 552 to the frame represented by the partial thumbnail image 810 in the upper left cell 1010 of the grid. The scrubbing can occur in a manner similar to the frame scrubbing discussed previously with respect to FIG. 8.

Figure 11:
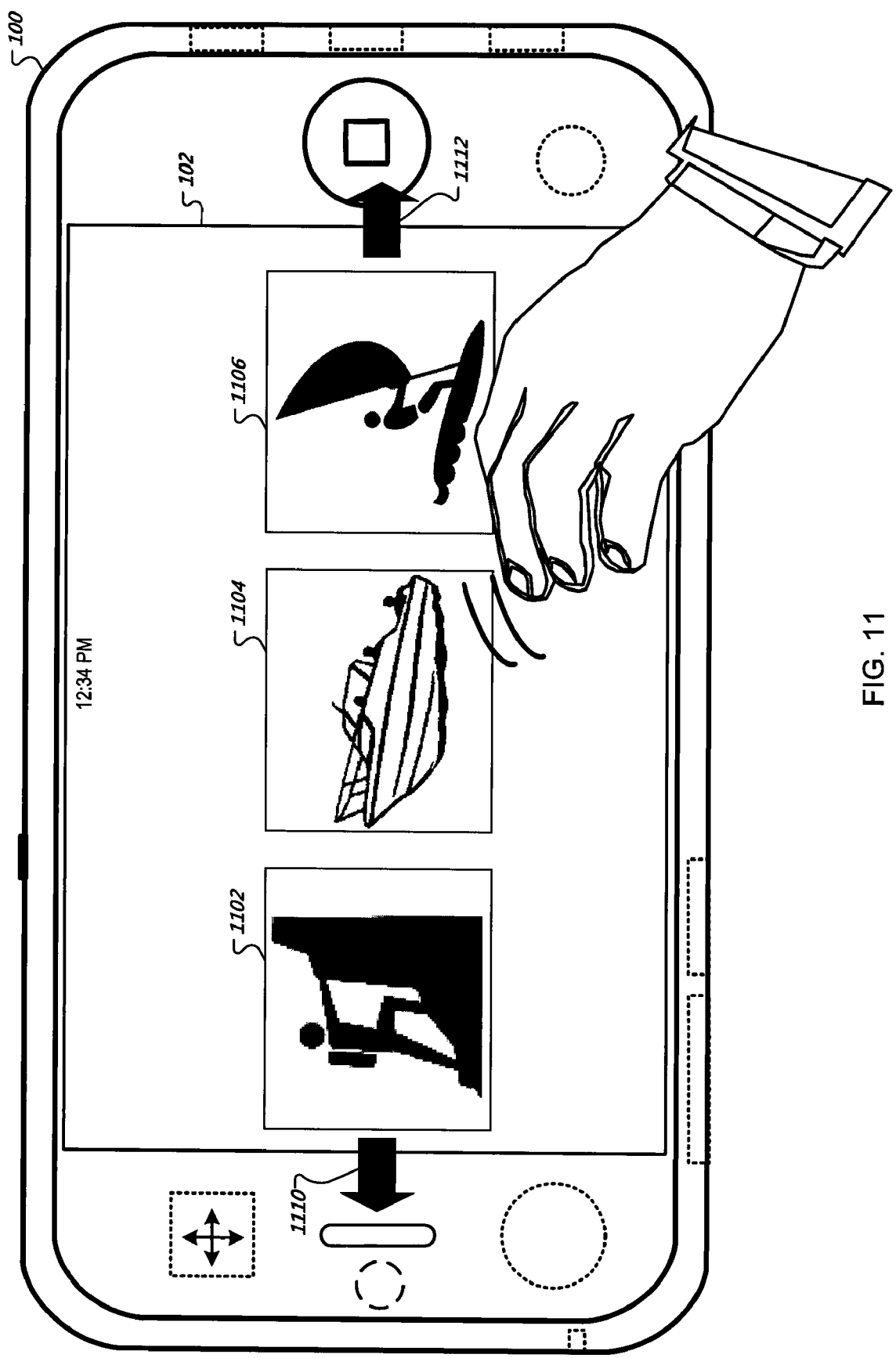
FIG. 11 illustrates an example user interface displaying a row of thumbnail images.

FIG. 11 illustrates an example user interface displaying a row of thumbnail images. In some implementations, thumbnail images representing video chapters can be displayed in a row, as shown in FIG. 11. Thumbnail images 1102-1106 are shown in a row of three. Other arrangements are possible, such as a row of thumbnail images that includes more or fewer visible thumbnail images (e.g., a row of five thumbnail images can be displayed). If three thumbnail images are displayed in a row, the three thumbnail images will generally be of a larger size than the thumbnail images 1002 and 1004 shown in the grid of thumbnail images in FIG. 10.

Similar to the previous discussion with respect to FIG. 10, the associated video can be played in-place in a selected thumbnail image, starting from the chapter represented by the selected thumbnail image, or a selected thumbnail image can be expanded and the associated video can play full-screen (starting from the chapter represented by the selected thumbnail image). Also similar to the discussion with respect to FIG. 10, the user can scrub through frames of a selected thumbnail image. In various implementations, two or more thumbnail images can be scrubbed or played simultaneously.

The user can scroll left or right to view thumbnail images not currently visible on the display 102, as illustrated by arrows 1110 and 1112. For example, the user can scroll left (e.g., by proving a left-to-right sliding gesture) to see thumbnail images corresponding to chapters appearing earlier in the video, and the user can scroll right (e.g., by providing a right-to-left sliding gesture) to see thumbnail images corresponding to chapters appearing later in the video.

In various implementations, a video license identifies one or more videos and corresponding periods of time (e.g., 30 days) during which the videos can be accessed (e.g., played back). A license can be stored on the mobile device or accessed from a remote service such as the license service 280. For example, a video might have a license that allows a user to view the video without limitation during a three day period. Once the license period has expired, the video can no longer be accessed and, in some implementations, is automatically deleted from the user's mobile device. Alternatively, once the license period has expired the user is given only partial access to the video (e.g., such as the ability to view a trailer for the video).

In some implementations, a time period is associated with a count down timer that is started as soon as a video is downloaded to the mobile device or the video is first accessed. Even if a user has paused the playback of a video, the count down timer continues until the count is zero at which point access to the video is prevented or restricted. In other implementations, a time period is a calendar period such as between March 12th and March 15th. In this example, only during the calendar period will full access to the video be allowed. In a further implementation, the a count-down timer is only decremented when the video is accessed. Other implementations are possible.

Figure 12:
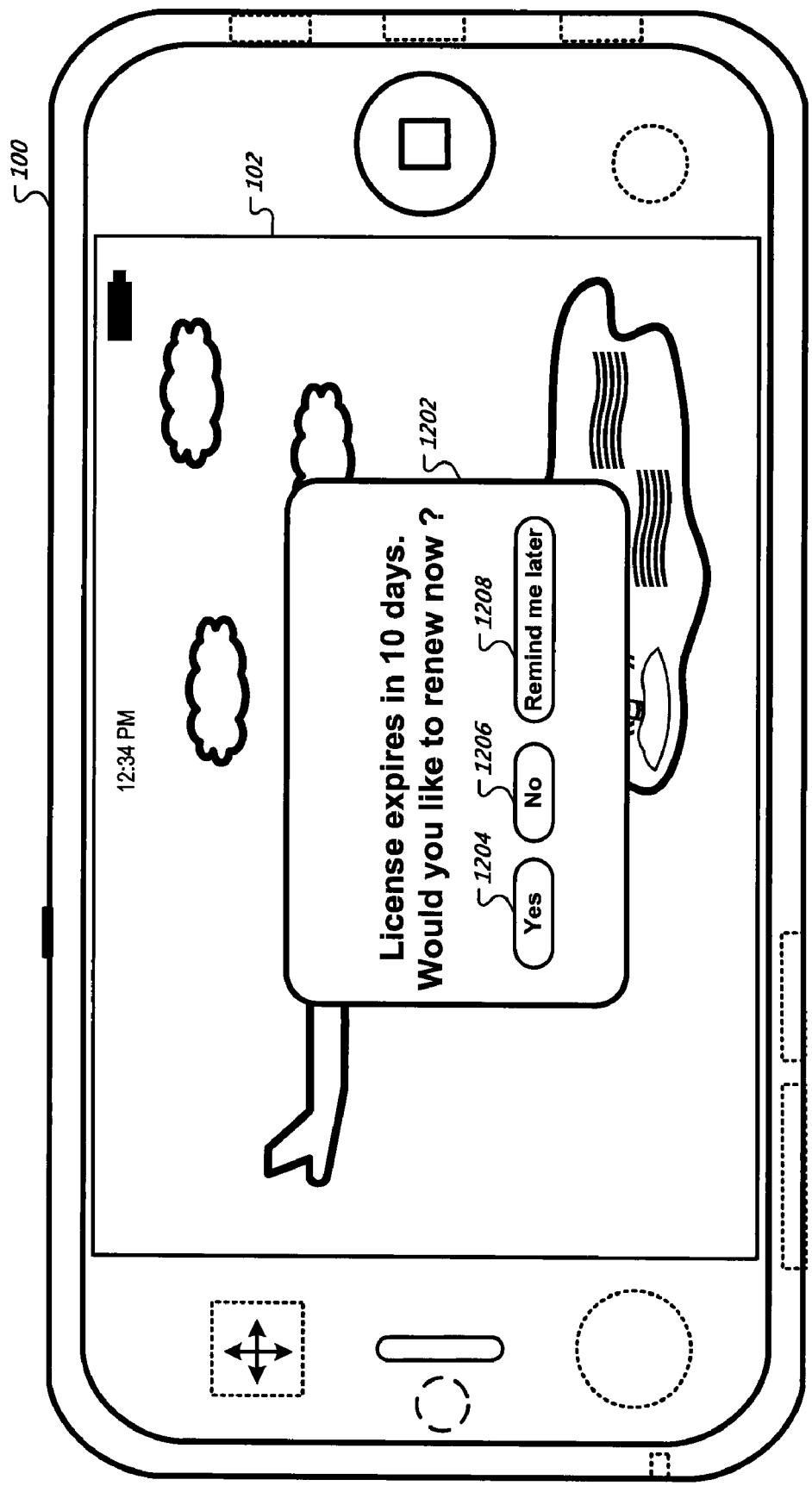
FIG. 12 is an example user interface illustrating the renewal of a video license.

FIG. 12 is an example user interface illustrating the renewal of a video license. As shown in FIG. 12, a license renewal reminder 1202 is displayed on top of a video presentation. The license renewal reminder 1202 can be displayed, for example, when it is determined that a license will expire in the near future. The license renewal reminder 1202 can be displayed when the user attempts to access or is accessing the associated video, for example. If the user selects a "Yes" button 1204, the license for the video can be renewed. For example, a license renewal request can be sent to the license service 280. The license renewal request identifies the license, the video, and may identify an account associated with the license (e.g., a user account associated with the license service 280). The mobile device 100 can receive a license renewal response (e.g., from the license service 280), and the video license can be renewed based on the renewal response such that the video can be accessed for an additional period of time (e.g., for an additional 30 days beyond the original expiration date). The license service 280 may effectuate a charge to the user's account for the license renewal.

If a user selects a "Remind me later" button 1208, the license renewal reminder 1202 is dismissed, but will reappear at a later time (e.g., the license renewal reminder 1202 can appear the next time the user attempts to access or accesses the video). If a user selects a "No" button 1206, the license renewal reminder 1202 is dismissed. If the user does not renew the license before the license expires, the video will no longer be able to be accessed after the license expiration date. In some implementations, the video is deleted from the mobile device 100 after the license expires.

Other reminders are possible including displaying a meter or a count down timer associated with the video at times when the user is attempted to play the video or during the video playback. Alternatively, the color of the video's title can be changed, a symbol can be placed next to the video's title, or other indicia can be presented on a device's display to indicate that the license for a video is nearing expiration or has already expired.

Figure 13:
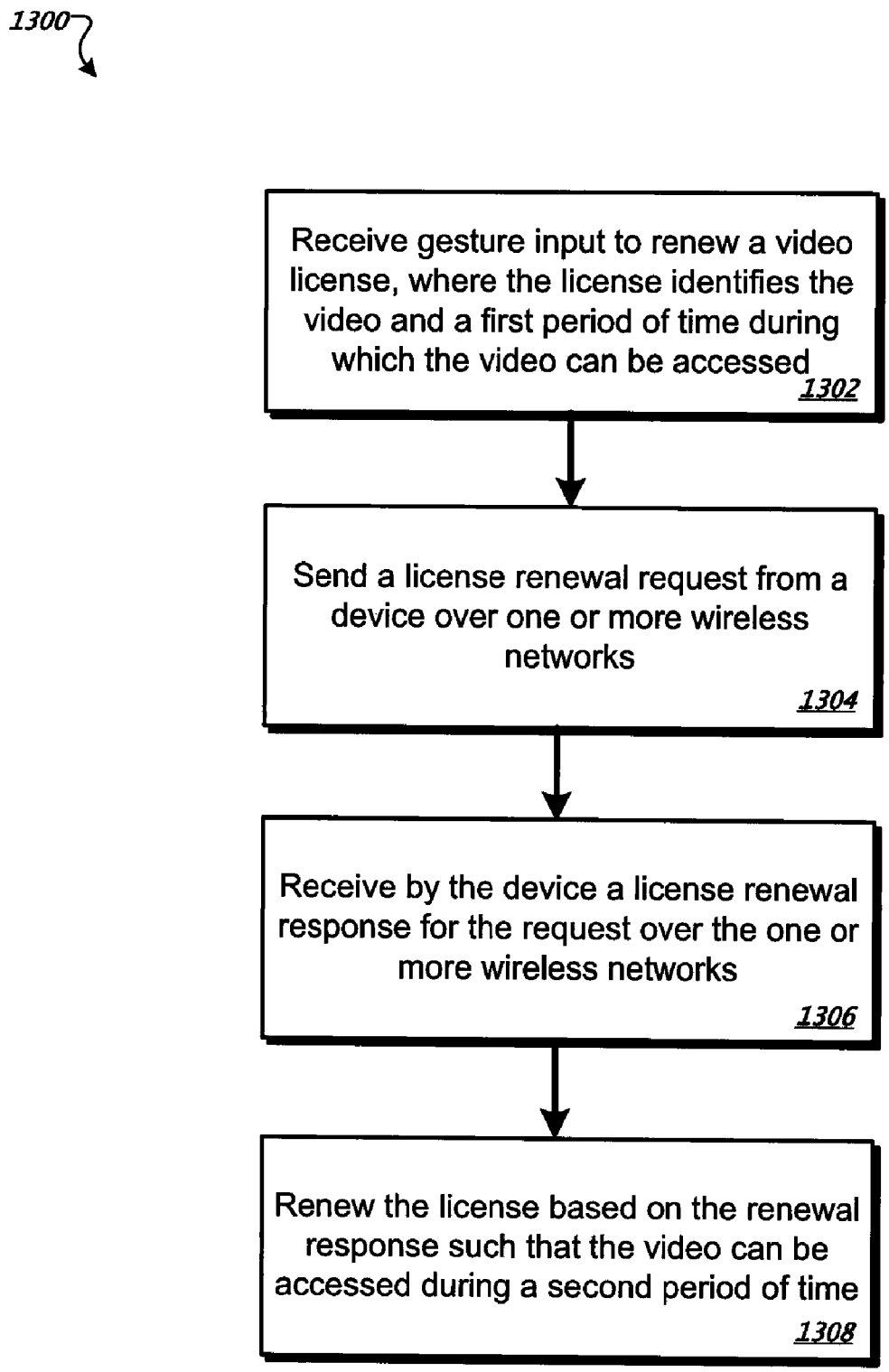
FIG. 13 is a flowchart of an example method for renewing a video license.

FIG. 13 is a flowchart of an example method 1300 for renewing a video license. A gesture input indicating that a video license can be renewed is received, where the license identifies the video and a first period of time during which the video can be accessed (step 1302). For example, the user can select the "Yes" button 1204 on the license renewal reminder 1202 indicating that they would like to renew a particular video license.

A license renewal request is sent over one or more wireless networks (step 1304). For example, a license renewal request can be sent by the mobile device 100 to the license service 280 over the network 214. A license renewal response for the request is then received by the device over the one or more wireless networks (step 1306). For example, a license renewal response can be received by the mobile device 100, over the network 214, from the license service 280. The license is then renewed based on the renewal response such that the video can be accessed during a second period of time (step 1308). For example, the license renewal response can indicate that the video can be accessed for an additional 30 days.

Figure 14:
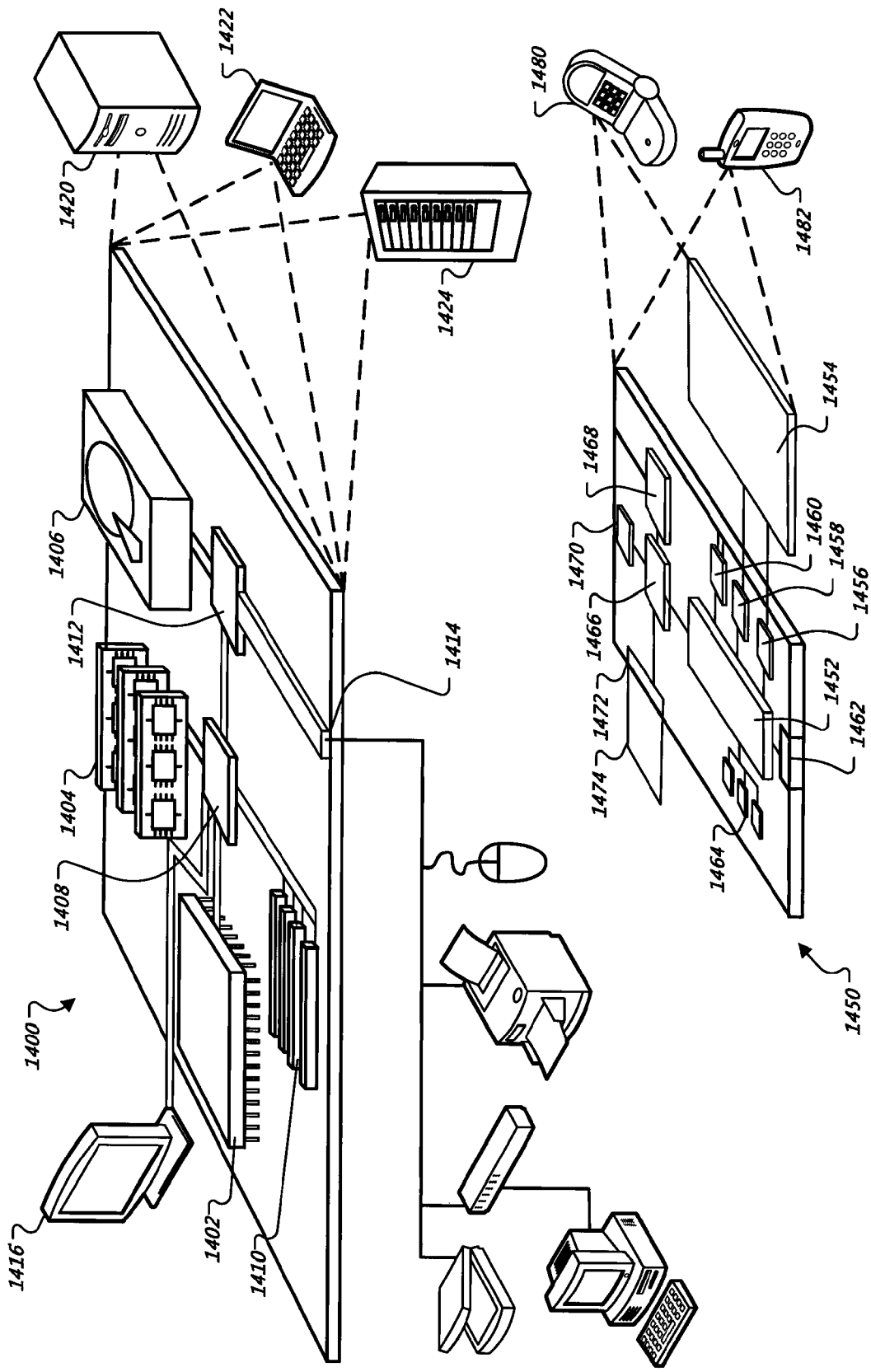
FIG. 14 is a block diagram of generic computing devices.

FIG. 14 is a block diagram of computing devices 1400, 1450 that may be used to implement the systems and methods described in this document, as either a client or as a server or plurality of servers. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a computer-readable medium. In one implementation, the memory 1404 is a volatile memory unit or units. In another implementation, the memory 1404 is a non-volatile memory unit or units.

The storage device 1406 is capable of providing mass storage for the computing device 1400. In one implementation, the storage device 1406 is a computer-readable medium. In various different implementations, the storage device 1406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1404, the storage device 1406, memory on processor 1402, or a propagated signal.

The high speed controller 1408 manages bandwidth-intensive operations for the computing device 1400, while the low speed controller 1412 manages lower bandwidth-intensive operations. Such allocation of duties is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can process instructions for execution within the computing device 1450, including instructions stored in the memory 1464. The processor may also include separate analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD display or an OLED display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provide in communication with processor 1452, so as to enable near area communication of device 1450 with other devices. External interface 1462 may provide, for example, for wired communication (e.g., via a docking procedure) or for wireless communication (e.g., via Bluetooth or other such technologies).

The memory 1464 stores information within the computing device 1450. In one implementation, the memory 1464 is a computer-readable medium. In one implementation, the memory 1464 is a volatile memory unit or units. In another implementation, the memory 1464 is a non-volatile memory unit or units. Expansion memory 1474 may also be provided and connected to device 1450 through expansion interface 1472, which may include, for example, a SIMM card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, WiFi, or other such transceiver (not shown). In addition, GPS receiver module 1470 may provide additional wireless data to device 1450, which may be used as appropriate by applications running on device 1450.

Device 1450 may also communication audibly using audio codec 1460, which may receive spoken information from a user and convert it to usable digital information. Audio codex 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in FIG. 14. For example, it may be implemented as a cellular telephone 1480. It may also be implemented as part of a smartphone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network).

Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer-implemented method, comprising:
   receiving a first gesture input incident on a touch-sensitive surface;
   in response to the first gesture input, transitioning a presentation of content in a content interface to a presentation of a number of chapter indicators for the content, each chapter indicator including a thumbnail image and associated with an offset in the content, where transitioning the presentation of content comprises displaying an animation in which the content interface flips to display the chapter indicators on a back side of the content interface;
   receiving a second gesture input incident on the surface to select a chapter indicator from the number of chapter indicators; and
   in response to the second gesture input, playing the content in the content interface from the selected chapter indicator's respective offset.

2. The method of claim 1 where playing the content in the content interface comprises:
   transitioning the presentation of the chapter indicators to a presentation of the content by displaying an animation in which the content interface flips to display the content on the back side of the content interface.

3. The method of claim 1 where the first gesture input is incident on an area of the surface in which the content is presented.

4. The method of claim 1, further comprising:
   pausing the content in response to the first gesture.

5. The method of claim 1, further comprising:
   presenting a control panel configured to allow a user to control the content playback and view the chapter indicators.

6. The method of claim 1 where each chapter indicator is associated with a name and where the name is presented with an image.

7. The method of claim 1 where playing the content comprises:
   scaling the selected chapter's respective image and playing the content in a content interface region occupied by the scaled image.

8. The method of claim 1 where playing the content comprises:
   in response to the second gesture input, scrubbing playback of the content relative to the selected chapter indicator's respective offset.

9. The method of claim 1 where the playback is presented in a thumbnail image of the selected chapter indicator.

10. The method of claim 1, further comprising:
    processing the content to create the chapter indicators.

11. A computer program product, encoded on a non-transitory, computer-readable medium, operable to cause data processing apparatus to perform operations comprising:
    receiving a first gesture input incident on a touch-sensitive surface;
    in response to the first gesture input, transitioning a presentation of content in a content interface to a presentation of a number of chapter indicators for the content, each chapter indicator including a thumbnail image and associated with an offset in the content, where transitioning the presentation of content comprises displaying an animation in which the content interface flips to display the chapter indicators on a back side of the content interface;
    receiving a second gesture input incident on the surface to select a chapter indicator from the number of chapter indicators; and
    in response to the second gesture input, playing the content in the content interface from the selected chapter indicator's respective offset.

12. An apparatus comprising:
    a touch-sensitive surface;
    a processor coupled to the touch-sensitive surface and configurable for displaying content in a content interface;
    an interface coupled to the processor and configurable for:
      receiving a first gesture input incident on the touch-sensitive surface;
      in response to the first gesture input, transitioning a presentation of content in the content interface to a presentation of a number of chapter indicators for the content, each chapter indicator including a thumbnail image and associated with an offset in the content, where transitioning the presentation of content comprises displaying an animation in which the content interface flips to display the chapter indicators on a back side of the content interface;
      receiving a second gesture input incident on the surface to select a chapter indicator from the number of chapter indicators; and
      in response to the second gesture input, playing the content in the content interface from the selected chapter indicator's respective offset.

13. The apparatus of claim 12 where playing the content in the content interface comprises:
    transitioning the presentation of the chapter indicators to a presentation of the content by displaying an animation in which the content interface flips to display the content on the back side of the content interface.

14. A computer-implemented method, comprising:
    receiving a first gesture input incident on a touch-sensitive surface;
    in response to the first gesture input, transitioning a presentation of content in a content interface to a presentation including a number of chapter indicators for the content, each chapter indicator including a thumbnail image and associated with an offset in the content;
    receiving a second gesture input incident on the surface to select a chapter indicator from the number of chapter indicators;
    in response to the second gesture input, displaying an animation in which the thumbnail image associated with the selected chapter indicator expands into a portion of the content interface; and playing the content in the content interface from the selected chapter indicator's respective offset.

15. The method of claim 14, where playing the content comprises automatically playing the content after the thumbnail image expands.

16. The method of claim 14, where presenting a number of chapter indicators comprises presenting the chapter indicators in a grid.

17. A computer-implemented method, comprising:
presenting a number of chapter indicators for content in a content interface, each chapter indicator including a thumbnail image representation of a first frame associated with a first offset in the content;
receiving a first gesture input incident on a touch-sensitive surface, where the first gesture corresponds to a thumbnail image representation of a selected chapter indicator;
in response to the first gesture input, transitioning the thumbnail image representation from the first frame to a second frame of the content associated with a second offset in the content;
receiving a second gesture input incident on the surface corresponding to the selected chapter indicator; and
in response to the second gesture input, playing the content in the content interface from the second offset of the content.

18. The method of claim 17, where playing the content in the content interface comprises playing the content in a portion occupied by the selected chapter indicator.

19. The method of claim 17, where playing the content in the content interface comprises displaying an animation in which the thumbnail image associated with the selected chapter indicator expands into a portion of the content interface.

20. The computer program product of claim 11 where playing the content in the content interface comprises:
transitioning the presentation of the chapter indicators to a presentation of the content by displaying an animation in which the content interface flips to display the content on the back side of the content interface.

21. The computer program product of claim 11 where the first gesture input is incident on an area of the surface in which the content is presented.

22. The computer program product of claim 11, further comprising:
pausing the content in response to the first gesture.

23. The computer program product of claim 11, further comprising:
presenting a control panel configured to allow a user to control the content playback and view the chapter indicators.

24. The computer program product of claim 11 where each chapter indicator is associated with a name and where the name is presented with an image.

25. The computer program product of claim 11 where playing the content comprises:
scaling the selected chapter's respective image and playing the content in a content interface region occupied by the scaled image.

26. The computer program product of claim 11 where playing the content comprises:
in response to the second gesture input, scrubbing playback of the content relative to the selected chapter indicator's respective offset.

27. The computer program product of claim 11 where the playback is presented in a thumbnail image of the selected chapter indicator.

28. The computer program product of claim 11, further comprising:
processing the content to create the chapter indicators.

29. The apparatus of claim 12 where the first gesture input is incident on an area of the surface in which the content is presented.

30. The apparatus of claim 12, further comprising:
pausing the content in response to the first gesture.

31. The apparatus of claim 12, further comprising:
presenting a control panel configured to allow a user to control the content playback and view the chapter indicators.

32. The apparatus of claim 12 where each chapter indicator is associated with a name and where the name is presented with an image.

33. The apparatus of claim 12 where playing the content comprises:
scaling the selected chapter's respective image and playing the content in a content interface region occupied by the scaled image.

34. The apparatus of claim 12 where playing the content comprises:
in response to the second gesture input, scrubbing playback of the content relative to the selected chapter indicator's respective offset.

35. The apparatus of claim 12 where the playback is presented in a thumbnail image of the selected chapter indicator.

36. The apparatus of claim 12, further comprising:
processing the content to create the chapter indicators.

37. A computer program product, encoded on a non-transitory, computer-readable medium, operable to cause data processing apparatus to perform operations comprising:
receiving a first gesture input incident on a touch-sensitive surface;
in response to the first gesture input, transitioning a presentation of content in a content interface to a presentation including a number of chapter indicators for the content, each chapter indicator including a thumbnail image and associated with an offset in the content;
receiving a second gesture input incident on the surface to select a chapter indicator from the number of chapter indicators;
in response to the second gesture input, displaying an animation in which the thumbnail image associated with the selected chapter indicator expands into a portion of the content interface; and
playing the content in the content interface from the selected chapter indicator's respective offset.

38. The computer program product of claim 37, where playing the content comprises automatically playing the content after the thumbnail image expands.

39. The computer program product of claim 37, where presenting a number of chapter indicators comprises presenting the chapter indicators in a grid.

40. An apparatus comprising:
a touch-sensitive surface;
a processor coupled to the touch-sensitive surface and configurable for displaying content in a content interface;
an interface coupled to the processor and configurable for:
receiving a first gesture input incident on a touch-sensitive surface;
in response to the first gesture input, transitioning a presentation of content in a content interface to a presentation including a number of chapter indicators for the content, each chapter indicator including a thumbnail image and associated with an offset in the content;

receiving a second gesture input incident on the surface to select a chapter indicator from the number of chapter indicators;

in response to the second gesture input, displaying an animation in which the thumbnail image associated with the selected chapter indicator expands into a portion of the content interface; and playing the content in the content interface from the selected chapter indicator's respective offset.

41. The apparatus of claim 40, where playing the content comprises automatically playing the content after the thumbnail image expands.

42. The apparatus of claim 40, where presenting a number of chapter indicators comprises presenting the chapter indicators in a grid.

43. A computer program product, encoded on a non-transitory, computer-readable medium, operable to cause data processing apparatus to perform operations comprising:

presenting a number of chapter indicators for content in a content interface, each chapter indicator including a thumbnail image representation of a first frame associated with a first offset in the content;

receiving a first gesture input incident on a touch-sensitive surface, where the first gesture corresponds to a thumbnail image representation of a selected chapter indicator;

in response to the first gesture input, transitioning the thumbnail image representation from the first frame to a second frame of the content associated with a second offset in the content;

receiving a second gesture input incident on the surface corresponding to the selected chapter indicator; and in response to the second gesture input, playing the content in the content interface from the second offset of the content.

44. The computer program product of claim 43, where playing the content in the content interface comprises playing the content in a portion occupied by the selected chapter indicator.

45. The computer program product of claim 43, where playing the content in the content interface comprises displaying an animation in which the thumbnail image associated with the selected chapter indicator expands into a portion of the content interface.

46. An apparatus comprising:

a touch-sensitive surface;

a processor coupled to the touch-sensitive surface and configurable for displaying content in a content interface;

an interface coupled to the processor and configurable for:

presenting a number of chapter indicators for content in a content interface, each chapter indicator including a thumbnail image representation of a first frame associated with a first offset in the content;

receiving a first gesture input incident on a touch-sensitive surface, where the first gesture corresponds to a thumbnail image representation of a selected chapter indicator;

in response to the first gesture input, transitioning the thumbnail image representation from the first frame to a second frame of the content associated with a second offset in the content;

receiving a second gesture input incident on the surface corresponding to the selected chapter indicator; and in response to the second gesture input, playing the content in the content interface from the second offset of the content.

47. The method of claim 46, where playing the content in the content interface comprises playing the content in a portion occupied by the selected chapter indicator.

48. The method of claim 46, where playing the content in the content interface comprises displaying an animation in which the thumbnail image associated with the selected chapter indicator expands into a portion of the content interface.

* * * * *

UNITED STATES PATENT AND TRADEMARK OFFICE
CERTIFICATE OF CORRECTION

| | | |
|---|---|---|
| PATENT NO. | : 7,956,848 B2 | Page 1 of 1 |
| APPLICATION NO. | : 11/849966 | |
| DATED | : June 7, 2011 | |
| INVENTOR(S) | : Imran A. Chaudhri | |

It is certified that error appears in the above-identified patent and that said Letters Patent is hereby corrected as shown below:

In column 2, line 62, delete "1A-1B" and insert -- 1A-1B. --, therefor.

In column 13, line 19, delete "of"Flying to" and insert -- of "Flying to --, therefor.

In column 13, line 20, delete "of"1:16"." and insert -- of "1:16". --, therefor.

In column 13, line 22, delete "of"16:12"." and insert -- of "16:12". --, therefor.

In column 13, line 30, delete "the a" and insert -- a --, therefor.

In column 15, line 11, delete "fall-sized" and insert -- full-sized --, therefor.

In column 16, line 40, delete "count down" and insert -- countdown --, therefor.

In column 16, line 42-43, delete "count down" and insert -- countdown --, therefor.

In column 16, line 48, delete "the a" and insert -- the --, therefor.

In column 17, line 15, delete "count down" and insert -- countdown --, therefor.

Signed and Sealed this
Twenty-ninth Day of November, 2011

David J. Kappos
*Director of the United States Patent and Trademark Office*